(12) United States Patent
Dutterer

(10) Patent No.: US 12,083,613 B2
(45) Date of Patent: Sep. 10, 2024

(54) TRACK SAW INCLUDING PLUNGE LOCKOUT MECHANISM

(71) Applicant: TECHTRONIC CORDLESS GP, Anderson, SC (US)

(72) Inventor: David E. Dutterer, Belton, SC (US)

(73) Assignee: Techtronic Cordless GP, Anderson, SC (US)

( * ) Notice: Subject to any disclaimer, the term of this patent is extended or adjusted under 35 U.S.C. 154(b) by 39 days.

(21) Appl. No.: 18/047,514

(22) Filed: Oct. 18, 2022

(65) Prior Publication Data

US 2024/0123523 A1 Apr. 18, 2024

(51) Int. Cl.
*B23D 59/00* (2006.01)
*B23D 13/06* (2006.01)
*B23D 45/04* (2006.01)
*B27B 9/02* (2006.01)

(52) U.S. Cl.
CPC ........... *B23D 59/005* (2013.01); *B23D 13/06* (2013.01); *B23D 45/044* (2013.01); *B27B 9/02* (2013.01)

(58) Field of Classification Search
CPC ...... B27G 19/04; B23D 47/02; B23D 45/006; B23D 59/007; B23D 47/12; B23D 45/16; B25H 1/0078; B27B 9/02; B27B 9/04; B27B 5/29; B25F 5/00; B28D 1/045
USPC .... 83/471.3, 167, 102.1, 34, 56, 478, 477.2, 83/473, 490, 471.2, 508.2; 30/374, 124, 30/286, 390, 391, 388, 376, 377, 371, 30/517, 514
See application file for complete search history.

(56) References Cited

U.S. PATENT DOCUMENTS

| | | | |
|---|---|---|---|
| 1,888,679 | A | 11/1932 | Walter |
| 1,911,045 | A | 5/1933 | Tinnen |
| 1,932,511 | A | 10/1933 | Clarke |
| 2,346,961 | A | 4/1944 | Gundelfinger et al. |
| 2,629,410 | A | 2/1953 | Edward |
| 2,677,399 | A | 5/1954 | Getsinger |
| 2,818,892 | A | 1/1958 | Price |
| 2,819,742 | A | 1/1958 | Blachly |
| 2,854,043 | A | 9/1958 | Ray |

(Continued)

FOREIGN PATENT DOCUMENTS

| | | |
|---|---|---|
| AU | 2010101055 A4 | 11/2010 |
| CN | 201067843 Y | 6/2008 |

(Continued)

*Primary Examiner* — Ghassem Alie
(74) *Attorney, Agent, or Firm* — Michael Best & Friedrich LLP

(57) ABSTRACT

A saw including a lockout mechanism having a lever and a plunge stop. The lever has a trigger abutment surface and is movable between a safety position in which the trigger abutment surface inhibits actuation of a trigger and a use position in which the trigger abutment surface permits actuation of the trigger. The plunge stop is coupled to the lever and is movable with the lever between a first position and a second position. The first position corresponds with the safety position of the lever. In the first position, the plunge stop inhibits a motor housing of the saw from being moved from a raised position toward a plunged position. The second position corresponds with the use position of the lever. In the second position, the plunge stop permits the motor housing to be moved from the raised position toward the plunged position.

20 Claims, 22 Drawing Sheets

(56) References Cited

U.S. PATENT DOCUMENTS

| | | |
|---|---|---|
| 2,911,960 A | 11/1959 | Benz et al. |
| 2,929,419 A | 3/1960 | Johnson |
| 3,011,530 A | 12/1961 | Ellard |
| 3,298,407 A | 1/1967 | Scott |
| 3,450,177 A | 6/1969 | Siegal et al. |
| 3,586,077 A | 6/1971 | Pease |
| 3,623,518 A | 11/1971 | Nicotra |
| 3,645,307 A | 2/1972 | Stocker |
| 3,730,042 A | 5/1973 | Price |
| 3,830,130 A | 8/1974 | Moore |
| 3,991,643 A | 11/1976 | Girardin |
| 4,058,150 A | 11/1977 | Pennington |
| 4,059,038 A | 11/1977 | Rietema |
| 4,078,309 A | 3/1978 | Wilson |
| 4,176,572 A | 12/1979 | Pennington |
| 4,202,233 A | 5/1980 | Larson |
| 4,224,855 A | 9/1980 | Des Roches |
| 4,245,390 A | 1/1981 | Bond |
| 4,307,513 A | 12/1981 | Genge |
| 4,353,165 A | 10/1982 | Albery |
| 4,356,748 A | 11/1982 | Tilton |
| 4,381,103 A | 4/1983 | Ferdinand et al. |
| 4,418,902 A | 12/1983 | Genge |
| 4,450,627 A | 5/1984 | Morimoto |
| 4,453,438 A | 6/1984 | Zelli |
| 4,463,644 A | 8/1984 | Ferdinand et al. |
| 4,539,881 A | 9/1985 | Maier |
| 4,607,555 A | 8/1986 | Erhard |
| 4,619,170 A | 10/1986 | Maier et al. |
| 4,628,608 A | 12/1986 | Kuhlmann et al. |
| 4,677,750 A | 7/1987 | Maier et al. |
| 4,694,720 A | 9/1987 | Brickner, Jr. et al. |
| 4,751,865 A | 6/1988 | Buckalew |
| 4,777,726 A | 10/1988 | Flowers |
| 4,856,394 A | 8/1989 | Clowers |
| 4,919,384 A | 4/1990 | Grimberg |
| 4,999,916 A | 3/1991 | Sistare |
| 5,010,651 A | 4/1991 | Techter et al. |
| 5,062,339 A | 11/1991 | Campos |
| 5,075,976 A | 12/1991 | Young |
| 5,136,910 A | 8/1992 | Kuhn et al. |
| 5,138,759 A | 8/1992 | Gruetzmacher |
| 5,201,863 A | 4/1993 | Peot |
| 5,206,999 A | 5/1993 | Stone |
| 5,235,753 A | 8/1993 | Stumpf |
| 5,239,756 A | 8/1993 | Matzo et al. |
| 5,271,155 A | 12/1993 | Fuchs et al. |
| 5,287,779 A | 2/1994 | Metzger, Jr. |
| 5,287,780 A | 2/1994 | Metzger, Jr. et al. |
| 5,365,822 A | 11/1994 | Stapleton et al. |
| 5,381,602 A | 1/1995 | Matzo et al. |
| 5,398,456 A | 3/1995 | Kleider |
| 5,427,006 A | 6/1995 | Finley |
| 5,452,515 A | 9/1995 | Schilling |
| 5,454,167 A | 10/1995 | Albery |
| 5,540,129 A | 7/1996 | Kalber et al. |
| 5,561,907 A | 10/1996 | Campbell et al. |
| 5,570,511 A | 11/1996 | Reich et al. |
| 5,669,371 A | 9/1997 | Rupprecht et al. |
| 5,675,898 A | 10/1997 | Kalber et al. |
| 5,676,126 A | 10/1997 | Rupprecht et al. |
| 5,678,314 A | 10/1997 | Braunbach et al. |
| 5,794,351 A | 8/1998 | Campbell et al. |
| 5,815,933 A | 10/1998 | Staniszewski |
| 5,822,864 A | 10/1998 | Campbell et al. |
| 5,911,482 A | 6/1999 | Campbell et al. |
| 6,055,734 A | 5/2000 | McCurry et al. |
| 6,094,827 A | 8/2000 | Campbell |
| 6,108,912 A | 8/2000 | Radigan |
| 6,108,916 A | 8/2000 | Zeiler et al. |
| 6,142,051 A | 11/2000 | Garuglieri |
| 6,202,311 B1 | 3/2001 | Nickels, Jr. |
| 6,237,230 B1 | 5/2001 | Campbell et al. |
| 6,276,064 B1 | 8/2001 | Campbell |
| 6,301,790 B1 | 10/2001 | Zeiler et al. |
| 6,367,790 B2 | 4/2002 | Ocklenburg et al. |
| 6,375,557 B1 | 4/2002 | Spangenberg et al. |
| 6,397,716 B1 | 6/2002 | Garuglieri |
| 6,412,179 B1 | 7/2002 | Ende |
| 6,502,316 B2 | 1/2003 | Campbell et al. |
| 6,543,143 B2 | 4/2003 | Moore et al. |
| 6,574,874 B2 | 6/2003 | Hartmann |
| 6,588,112 B2 | 7/2003 | Zeiler et al. |
| 6,591,509 B2 | 7/2003 | LeBlanc |
| 6,601,305 B1 | 8/2003 | Fukuoka |
| 6,681,493 B2 | 1/2004 | Mori et al. |
| 6,691,418 B1 | 2/2004 | Lewin et al. |
| 6,708,411 B2 | 3/2004 | Kani |
| 6,758,123 B2 | 7/2004 | Svetlik et al. |
| 6,848,683 B2 | 2/2005 | Foshag et al. |
| 6,878,050 B2 | 4/2005 | Wendt et al. |
| 6,886,259 B2 | 5/2005 | Kani |
| 6,945,523 B2 | 9/2005 | Degen |
| 6,953,394 B2 | 10/2005 | Wendt et al. |
| 6,991,009 B1 | 1/2006 | Wedeward |
| 7,039,548 B2 | 5/2006 | Takano et al. |
| 7,073,266 B2 | 7/2006 | Moore et al. |
| 7,093,828 B2 | 8/2006 | Murray et al. |
| 7,096,588 B2 | 8/2006 | Zeiler et al. |
| 7,114,714 B2 | 10/2006 | Wong |
| 7,191,526 B2 | 3/2007 | Zeiler et al. |
| 7,198,042 B2 | 4/2007 | Harris |
| 7,219,434 B2 | 5/2007 | Moore et al. |
| 7,219,885 B2 | 5/2007 | Nardozza |
| 7,249,548 B2 | 7/2007 | Blanco et al. |
| 7,281,332 B2 | 10/2007 | Niwa et al. |
| 7,300,339 B2 | 11/2007 | Gaul et al. |
| 7,308,764 B2 | 12/2007 | Zeiler et al. |
| 7,434,321 B2 | 10/2008 | Niwa et al. |
| 7,458,301 B2 | 12/2008 | Yu |
| 7,497,152 B2 | 3/2009 | Zeiler et al. |
| 7,516,551 B2 | 4/2009 | Yoshida |
| 7,523,691 B2 | 4/2009 | Terashima et al. |
| 7,549,229 B2 | 6/2009 | Aoyama et al. |
| 7,555,976 B2 | 7/2009 | Logan et al. |
| 7,562,456 B2 | 7/2009 | Roehm et al. |
| 7,621,206 B2 | 11/2009 | Makropoulos |
| D612,715 S | 3/2010 | Weinberg et al. |
| 7,757,592 B2 | 7/2010 | Wilson |
| 7,778,796 B2 | 8/2010 | Takano et al. |
| 7,823,293 B2 | 11/2010 | Walmsley et al. |
| 7,850,154 B2 | 12/2010 | Feuge |
| 7,856,723 B2 | 12/2010 | Thomas et al. |
| 7,866,051 B2 | 1/2011 | Niwa |
| 7,896,323 B2 | 3/2011 | Murray et al. |
| 7,905,166 B2 | 3/2011 | Thomas et al. |
| 7,908,952 B2 | 3/2011 | Wilson et al. |
| 7,926,397 B2 | 4/2011 | Logan et al. |
| 7,958,641 B1 | 6/2011 | Ende |
| 7,975,388 B2 | 7/2011 | Fuchs et al. |
| 8,056,243 B2 | 11/2011 | Sargeant et al. |
| 8,060,235 B2 | 11/2011 | Johnson et al. |
| 8,061,043 B2 | 11/2011 | Allen et al. |
| 8,181,559 B1 | 5/2012 | End |
| 8,201,483 B2 | 6/2012 | Wilson |
| 8,209,872 B1 | 7/2012 | Ende |
| 8,220,372 B2 | 7/2012 | Janson |
| 8,230,768 B2 | 7/2012 | Ozawa et al. |
| 8,267,389 B2 | 9/2012 | Roesch et al. |
| 8,272,133 B2 | 9/2012 | Wascow |
| 8,313,095 B2 | 11/2012 | Kloepfer et al. |
| 8,359,959 B2 | 1/2013 | Aoyama et al. |
| 8,439,339 B2 | 5/2013 | Roesch et al. |
| 8,479,401 B2 | 7/2013 | Barkley |
| 8,485,078 B2 | 7/2013 | Janson |
| 8,588,959 B2 | 11/2013 | Johnson et al. |
| 8,616,108 B2 | 12/2013 | Lukas et al. |
| 8,640,346 B2 | 2/2014 | Allen et al. |
| 8,641,024 B1 | 2/2014 | Murray et al. |
| 8,661,957 B2 | 3/2014 | Aoyama et al. |
| 8,671,811 B2 | 3/2014 | Rybka |
| 8,684,052 B2 | 4/2014 | Breitenbach |
| 8,985,566 B2 | 3/2015 | Chuang |
| 9,038,516 B2 | 5/2015 | Chen et al. |

(56) References Cited

U.S. PATENT DOCUMENTS

| | | |
|---|---|---|
| 9,044,869 B2 | 6/2015 | Xing et al. |
| 9,156,184 B2 | 10/2015 | Stoffel |
| 9,308,626 B2 | 4/2016 | Chuang |
| 9,427,848 B1 | 8/2016 | Murray et al. |
| 9,475,140 B2 | 10/2016 | Kume et al. |
| 9,522,479 B2 | 12/2016 | Boehme et al. |
| 9,623,583 B2 | 4/2017 | Sinzig et al. |
| 9,744,650 B2 | 8/2017 | Kregloski |
| 9,751,139 B2 | 9/2017 | Groth |
| 9,908,256 B2 | 3/2018 | Sinzig et al. |
| 9,937,638 B2 | 4/2018 | Numata |
| 9,981,402 B2 | 5/2018 | Cuenca |
| 10,005,199 B2 | 6/2018 | Sinzig et al. |
| 10,099,398 B2 | 10/2018 | Wang |
| D846,365 S | 4/2019 | Wang |
| 10,272,544 B1 | 4/2019 | Murray et al. |
| 10,363,682 B2 | 7/2019 | Firth |
| 10,442,058 B2 | 10/2019 | Wang |
| 10,456,944 B2 | 10/2019 | Ursell et al. |
| 10,471,624 B2 | 11/2019 | Baxivanelis |
| 10,486,251 B2 | 11/2019 | Nakashima |
| 10,518,343 B2 | 12/2019 | Ogino et al. |
| 2003/0233925 A1 | 12/2003 | Makropoulos |
| 2003/0233926 A1 | 12/2003 | Makropoulos |
| 2005/0061128 A1 | 3/2005 | Caughlin et al. |
| 2006/0011032 A1 | 1/2006 | Brown et al. |
| 2006/0011034 A1 | 1/2006 | Gehret et al. |
| 2006/0086219 A1 | 4/2006 | Zeiler et al. |
| 2006/0107536 A1 | 5/2006 | Buck et al. |
| 2006/0117579 A1 | 6/2006 | Zeiler et al. |
| 2006/0117920 A1 | 6/2006 | Zeiler et al. |
| 2006/0191387 A1 | 8/2006 | Weber et al. |
| 2006/0283024 A1 | 12/2006 | Wilson et al. |
| 2007/0007702 A1 | 1/2007 | Brandl |
| 2007/0144319 A1 | 6/2007 | Jones |
| 2007/0157781 A1 | 7/2007 | Wilson et al. |
| 2007/0157782 A1 | 7/2007 | Hetcher et al. |
| 2007/0180710 A1 | 8/2007 | Moore et al. |
| 2007/0222130 A1 | 9/2007 | Leinbach et al. |
| 2008/0041209 A1 | 2/2008 | Li |
| 2009/0133559 A1 | 5/2009 | Sargeant et al. |
| 2009/0308218 A1 | 12/2009 | Raff et al. |
| 2010/0156015 A1 | 6/2010 | Klein et al. |
| 2011/0025265 A1 | 2/2011 | Mochida et al. |
| 2011/0072943 A1 | 3/2011 | Chen |
| 2011/0083540 A1 | 4/2011 | Xing et al. |
| 2011/0219628 A1 | 9/2011 | Harrison et al. |
| 2012/0079931 A1 | 4/2012 | Hansen |
| 2012/0132049 A1 | 5/2012 | Bokelaar |
| 2012/0247299 A1 | 10/2012 | Wilson |
| 2012/0317823 A1 | 12/2012 | Vantran et al. |
| 2013/0199049 A1* | 8/2013 | Xing ................ B27G 19/04 |
| | | 30/377 |
| 2013/0318801 A1 | 12/2013 | Nicholson |
| 2014/0026725 A1 | 1/2014 | Makropoulos |
| 2014/0047967 A1 | 2/2014 | Makropoulos |
| 2014/0103595 A1 | 4/2014 | Yang |
| 2014/0290458 A1 | 10/2014 | Sinzig et al. |
| 2014/0345436 A1 | 11/2014 | Behrisch |
| 2015/0047484 A1 | 2/2015 | Lane |
| 2015/0059186 A1 | 3/2015 | Bermes et al. |
| 2015/0135922 A1 | 5/2015 | Bokelaar |
| 2015/0321374 A1 | 11/2015 | Ursell et al. |
| 2015/0375389 A1 | 12/2015 | Semann |
| 2016/0243631 A1 | 8/2016 | Brewster et al. |
| 2016/0279764 A1 | 9/2016 | Thomas |
| 2017/0120353 A1 | 5/2017 | Tennant et al. |
| 2017/0159793 A1 | 6/2017 | Schorpp et al. |
| 2017/0348829 A1 | 12/2017 | Kregloski |
| 2018/0071955 A1 | 3/2018 | Rybka et al. |
| 2018/0093335 A1 | 4/2018 | Hart |
| 2018/0290328 A1 | 10/2018 | Zuler |
| 2018/0345523 A1 | 12/2018 | Ursell et al. |
| 2018/0361612 A1 | 12/2018 | Wang |
| 2019/0039258 A1 | 2/2019 | Lee |
| 2019/0044415 A1 | 2/2019 | Hatfield et al. |
| 2019/0076940 A1 | 3/2019 | Crabb et al. |
| 2019/0091779 A1 | 3/2019 | Crabb et al. |
| 2019/0143555 A1 | 5/2019 | Nakashima |
| 2019/0217446 A1 | 7/2019 | Wang |
| 2019/0217447 A1 | 7/2019 | Wang |
| 2019/0232400 A1 | 8/2019 | Ender |
| 2019/0329337 A1 | 10/2019 | Owens et al. |
| 2019/0381632 A1 | 12/2019 | Wang et al. |
| 2019/0388984 A1 | 12/2019 | Kuragano |
| 2020/0023541 A1 | 1/2020 | Strempke et al. |
| 2020/0086405 A1 | 3/2020 | Ogino et al. |
| 2020/0180117 A1 | 6/2020 | Kloepfer et al. |
| 2020/0398454 A1 | 12/2020 | Zsuponyo |
| 2021/0060811 A1* | 3/2021 | Kani ................... B27G 19/02 |
| 2022/0161455 A1 | 5/2022 | VanDaalwyk et al. |
| 2023/0158586 A1 | 5/2023 | Rau et al. |
| 2023/0264275 A1 | 8/2023 | Dutterer |
| 2023/0294184 A1* | 9/2023 | Kour ..................... B27B 9/04 |
| | | 83/478 |

FOREIGN PATENT DOCUMENTS

| | | |
|---|---|---|
| CN | 100448635 C | 1/2009 |
| CN | 101537595 B | 4/2011 |
| CN | 102407571 A | 4/2012 |
| CN | 102744458 A | 10/2012 |
| CN | 203031036 U | 7/2013 |
| CN | 203140888 U | 8/2013 |
| CN | 102814549 B | 9/2014 |
| CN | 104511949 A | 4/2015 |
| CN | 204524406 U | 8/2015 |
| CN | 103418842 B | 9/2015 |
| CN | 204914075 U | 12/2015 |
| CN | 205020943 U | 2/2016 |
| CN | 205184946 U | 4/2016 |
| CN | 205200693 U | 5/2016 |
| CN | 105921811 A | 9/2016 |
| CN | 205888243 U | 1/2017 |
| CN | 104722837 B | 4/2017 |
| CN | 206425620 U | 8/2017 |
| CN | 208392223 U | 1/2019 |
| CN | 208614252 U | 3/2019 |
| CN | 209350095 U | 9/2019 |
| CN | 210475706 U | 5/2020 |
| DE | 2413816 A1 | 10/1975 |
| DE | 2542322 A1 | 3/1977 |
| DE | 7820060 U1 | 10/1978 |
| DE | 2829297 A1 | 1/1980 |
| DE | 3007310 C2 | 8/1983 |
| DE | 3315169 A1 | 11/1983 |
| DE | 3308199 A1 | 9/1984 |
| DE | 2547459 C2 | 11/1984 |
| DE | 3420183 A1 | 12/1985 |
| DE | 3434469 A1 | 3/1986 |
| DE | 8604618 U1 | 4/1986 |
| DE | 3500371 A1 | 7/1986 |
| DE | 3540410 A1 | 5/1987 |
| DE | 3609809 A1 | 9/1987 |
| DE | 8706730 U1 | 9/1987 |
| DE | 3633655 A1 | 4/1988 |
| DE | 8803627 U1 | 5/1988 |
| DE | 8807584 | 7/1988 |
| DE | 3718232 A1 | 9/1988 |
| DE | 3807516 C1 | 6/1989 |
| DE | 8905442 U1 | 6/1989 |
| DE | 3806814 A1 | 9/1989 |
| DE | 9003772 U1 | 6/1990 |
| DE | 3906300 A1 | 8/1990 |
| DE | 3912307 A1 | 10/1990 |
| DE | 3919702 A1 | 12/1990 |
| DE | 3943134 A1 | 7/1991 |
| DE | 4023101 A1 | 1/1992 |
| DE | 9016090 U1 | 4/1992 |
| DE | 9112286 U1 | 2/1993 |
| DE | 4130174 A1 | 3/1993 |
| DE | 4212460 A1 | 10/1993 |
| DE | 9319867 U1 | 4/1994 |
| DE | 9420679 U1 | 2/1995 |

(56) References Cited

FOREIGN PATENT DOCUMENTS

| | | |
|---|---|---|
| DE | 19507062 A1 | 8/1995 |
| DE | 3606525 C2 | 5/1996 |
| DE | 29510061 U1 | 10/1996 |
| DE | 3104733 C3 | 1/1997 |
| DE | 3635159 C2 | 5/1998 |
| DE | 29801989 U1 | 8/1998 |
| DE | 29809921 U1 | 10/1998 |
| DE | 19751599 A1 | 5/1999 |
| DE | 29907474 U1 | 7/1999 |
| DE | 29820244 U1 | 3/2000 |
| DE | 20012674 U1 | 2/2001 |
| DE | 20017862 U1 | 2/2001 |
| DE | 20100087 U1 | 3/2001 |
| DE | 10025077 A1 | 4/2001 |
| DE | 20002160 U1 | 6/2001 |
| DE | 10007294 A1 | 8/2001 |
| DE | 10011740 A1 | 9/2001 |
| DE | 20119603 U1 | 2/2002 |
| DE | 10159485 A1 | 7/2002 |
| DE | 20213291 U1 | 10/2002 |
| DE | 20023085 U1 | 12/2002 |
| DE | 20219273 U1 | 2/2003 |
| DE | 19507286 C2 | 6/2003 |
| DE | 10360373 B3 | 3/2005 |
| DE | 102004017420 A1 | 11/2005 |
| DE | 202006004228 U1 | 6/2006 |
| DE | 102006034136 A1 | 4/2007 |
| DE | 202005019483 U1 | 4/2007 |
| DE | 202006006140 U1 | 8/2007 |
| DE | 102006057951 A1 | 6/2008 |
| DE | 102006060822 A1 | 6/2008 |
| DE | 102008059838 A1 | 6/2010 |
| DE | 102009060088 A1 | 8/2010 |
| DE | 102004002275 B4 | 5/2011 |
| DE | 102006011280 B4 | 8/2011 |
| DE | 10334757 B4 | 2/2012 |
| DE | 102011103476 A1 | 12/2012 |
| DE | 202012009204 U1 | 1/2013 |
| DE | 202013100111 U1 | 2/2013 |
| DE | 102011114375 A1 | 3/2013 |
| DE | 102011116873 A1 | 4/2013 |
| DE | 102011089555 A1 | 6/2013 |
| DE | 102006025137 B4 | 8/2013 |
| DE | 202013104555 U1 | 10/2013 |
| DE | 102005021789 B4 | 3/2014 |
| DE | 202014103166 U1 | 8/2014 |
| DE | 102014010486 A1 | 1/2016 |
| DE | 102015225392 A1 | 6/2017 |
| DE | 202018105381 U1 | 10/2018 |
| DE | 202018107178 U1 | 1/2019 |
| DE | 202018100612 U1 | 5/2019 |
| DE | 102018112324 A1 | 11/2019 |
| EP | 0012404 B1 | 5/1983 |
| EP | 0204023 B1 | 6/1989 |
| EP | 0246417 B1 | 9/1990 |
| EP | 0525437 A2 | 2/1993 |
| EP | 0459121 B1 | 11/1994 |
| EP | 0598088 B1 | 9/1995 |
| EP | 0496047 B1 | 2/1996 |
| EP | 0712686 A1 | 5/1996 |
| EP | 0765716 A1 | 4/1997 |
| EP | 0642896 B1 | 10/1997 |
| EP | 1279467 A1 | 1/2003 |
| EP | 0925893 B1 | 4/2004 |
| EP | 0990492 B1 | 11/2004 |
| EP | 1193036 B1 | 5/2005 |
| EP | 1361019 B1 | 10/2005 |
| EP | 1418018 B1 | 5/2006 |
| EP | 1457299 B1 | 8/2006 |
| EP | 1522394 B1 | 7/2008 |
| EP | 1892056 B1 | 5/2009 |
| EP | 2082832 A2 | 7/2009 |
| EP | 1964648 B1 | 12/2010 |
| EP | 2075080 B1 | 5/2011 |
| EP | 2581166 B1 | 9/2014 |
| EP | 2335892 B1 | 5/2015 |
| EP | 2412499 B1 | 7/2015 |
| EP | 2567796 B1 | 9/2015 |
| EP | 2412489 B1 | 6/2016 |
| EP | 2581167 B1 | 7/2016 |
| EP | 2412486 B1 | 10/2016 |
| EP | 2638997 B1 | 11/2016 |
| EP | 2250005 B1 | 3/2017 |
| EP | 2881228 B1 | 3/2017 |
| EP | 2762282 B1 | 3/2018 |
| EP | 2638995 B1 | 4/2019 |
| EP | 2638996 B1 | 5/2019 |
| EP | 2881229 B1 | 5/2019 |
| EP | 2641710 B1 | 7/2019 |
| FR | 2527497 A1 | 12/1983 |
| GB | 2302058 A | 1/1997 |
| GB | 2362128 A | 11/2001 |
| JP | H047101 U | 1/1992 |
| JP | 2000071120 A | 3/2000 |
| JP | 2007136794 A | 6/2007 |
| JP | 4204749 B2 | 1/2009 |
| WO | WO9213672 A1 | 8/1992 |
| WO | WO9301922 A1 | 2/1993 |
| WO | WO9309913 A1 | 5/1993 |
| WO | WO02060642 A1 | 8/2002 |
| WO | WO03000451 A2 | 1/2003 |
| WO | WO2009095300 A1 | 8/2009 |
| WO | WO2009147152 A1 | 12/2009 |
| WO | WO2011047663 A2 | 4/2011 |
| WO | WO2011085681 A1 | 4/2011 |
| WO | WO2015007032 A1 | 1/2015 |
| WO | WO2015014038 A1 | 2/2015 |
| WO | WO2015036604 A1 | 3/2015 |
| WO | WO2016128232 A1 | 8/2016 |
| WO | WO2016128233 A1 | 8/2016 |
| WO | WO2018148792 A1 | 8/2018 |
| WO | WO2019063685 A1 | 4/2019 |
| WO | WO2019238511 A2 | 12/2019 |
| WO | WO2021116479 A1 | 6/2021 |

\* cited by examiner

TRACK SAW INCLUDING PLUNGE LOCKOUT MECHANISM

FIELD OF THE DISCLOSURE

The present disclosure relates to track saws, and more particularly to mode selector mechanisms for track saws.

BACKGROUND OF THE DISCLOSURE

Some saws may be plunged prior or during operation of the saw. Different types of cuts require different plunge depths on the saw blade. Periodically, saws require blade exchanges when blades become dull. During a blade exchange, the blade is typically moved to a plunged position with a portion of the blade protruding below a shoe of the saw. Accordingly, it is often desired to include a lockout mechanism to inhibit inadvertent plunging and/or rotation of the saw blade. Such a lockout mechanism must be easy for a user to operate and afford the user options to operate the saw for any given cutting or blade exchange operation.

SUMMARY OF THE DISCLOSURE

The disclosure provides, in one aspect, a saw including a shoe, a motor housing, a motor, a trigger, and a lockout mechanism. The motor housing is pivotably coupled to the shoe and movable between a raised position in which a saw blade is located above the shoe and a plunged position in which at least a portion of the saw blade is located beneath the shoe. The motor is located within the motor housing and configured to rotate the saw blade. The trigger is configured to activate the motor in response to being actuated. The lockout mechanism includes a lever and a plunge stop. The lever includes a first end, an opposite second end, and a trigger abutment surface either at the first end or between the first end and the second end. The lever is movable between a safety position and a use position. In the safety position, the trigger abutment surface inhibits actuation of the trigger. In the use position, the trigger abutment surface permits actuation of the trigger. The plunge stop is coupled to the second end of the lever and is movable with the lever between a first position and a second position. The first position corresponds with the safety position of the lever to inhibit the motor housing from being moved from the raised position toward the plunged position. The second position corresponds with the use position of the lever to permit the motor housing to be moved from the raised position toward the plunged position.

In some embodiments, the lockout mechanism includes a spring biasing the lever to the safety position such that a force input on the lever against the bias of the spring can move the lever from the safety position to the use position.

In some embodiments, the lever is pivotable about a pivot joint between the first end and the second end of the lever, and wherein the spring presses against the lever between the first end and the pivot joint.

In some embodiments, when the lever is in the use position and the motor housing is at least partially plunged, the force input may be removed, and the lockout mechanism maintains the lever in the use position at least until the motor housing is returned to the raised position.

In some embodiments, upon full retraction of the motor housing, the spring returns the lever to the safety position.

In some embodiments, the saw further comprises a depth guide coupled to the shoe, wherein the depth guide includes an arcuate channel in which the plunge stop is receivable when in the second position, and wherein the lever is maintained in the use position when the plunge stop is positioned within the channel.

In some embodiments, the second end of the lever is configured as a post, and the plunge stop includes a bifurcated for in which the post is received.

In some embodiments, the saw further comprises a depth guide coupled to the shoe. In the first position, the plunge stop abuts an abutment surface of the depth guide, and in the second position, the plunge stop is misaligned with the abutment surface and aligned with an arcuate channel within the depth guide.

The disclosure provides, in another independent aspect, a saw including a shoe, a motor housing, a motor, a trigger, and a lockout mechanism. The motor housing is pivotably coupled to the shoe and movable between a raised position in which a saw blade is located above the shoe and at least one plunged position in which at least a portion of the saw blade is located beneath the shoe. The motor is located within the motor housing and configured to rotate the saw blade. The trigger is configured to activate the motor in response to being actuated. The lockout mechanism includes a first lever, a second lever, a first plunge stop, and a second plunge stop. The first plunge stop is movable by at least one of the first lever or the second lever between a first position and a second position. In the first position of the first plunge stop, the first plunge stop is configured to inhibit the motor housing from being moved from the raised position toward the plunged position. In the second position of the first plunge stop, the first plunge stop is configured to permit the motor housing to be moved from the raised position toward the plunged position. The second plunge stop is movable by the second lever between a use position and a blade exchange position. In the use position, the second plunge stop is configured to permit the motor housing to be moved between the raised position and a first plunged position defining a maximum plunge depth of the saw blade. In the blade exchange position, second plunge stop retains the motor housing in a second plunged position defining a blade exchange plunge depth of the saw blade that is less than the maximum plunge depth.

In some embodiments, the second plunge stop is further movable by the second lever to a fully plunged position, in which the second plunge stop is configured to retain the motor housing in the first plunged position corresponding with the maximum plunge depth.

In some embodiments, the first lever includes a first trigger abutment surface and the second lever includes a second trigger abutment surface, wherein when the second plunge stop is moved by the second lever to the blade exchange position, at least one of the first trigger abutment surface or the second abutment surface inhibits actuation of the trigger.

In some embodiments, when the second plunge stop is moved by the second lever to the blade exchange position, the second abutment surface inhibits actuation of the trigger.

In some embodiments, the second lever includes a hook configured to engage a corresponding hook on the trigger to inhibit actuation of the trigger in the blade exchange position.

In some embodiments, the saw further comprises a shoe plate extending from the shoe, the shoe plate supporting the motor housing on the shoe, the shoe plate being coupled to the shoe by a trim angle adjustment mechanism operable to adjust a trim angle of the saw blade relative to the shoe when the second plunge stop is in the blade exchange position.

In some embodiments, the saw further comprises a spring configured to bias the second plunge stop to the blade exchange position.

In some embodiments, the second plunge stop includes a first end engageable with the second lever and an opposite second end, and wherein the second plunge stop is pivotable about a pivot joint located between the first end and the second end of the second plunge stop.

In some embodiments, the spring applies a biasing force to the second plunge stop between the pivot joint and the second end of the second plunge stop.

In some embodiments, the lockout mechanism further comprises a connector bar coupled to both the first lever and the second lever, and the first plunge stop is movable by either (A) the first lever or (B) the second lever via the connector bar between the first position and the second position.

In some embodiments, the connector bar includes a slot selectively in contact with one of the first lever and the second lever and a hole coupled to the other of the first lever and the second lever.

In some embodiments, the first lever includes a first end, an opposite second end coupled to the first plunge stop, a first pivot joint between the first end and the second end, and a first connecting joint between the first pivot joint and the second end; the second lever includes a third end, an opposite fourth end coupled to the second plunge stop, a second pivot joint between the third end and the fourth end, and a second connecting joint between the second pivot joint and the fourth end; the slot is configured to engage one of the first connecting joint and the second connecting joint; and the hole engages the other of the first connecting joint and the second connecting joint.

In some embodiments, the first lever includes a first end, an opposite second end, and a trigger abutment surface at the first end or between the first end and the second end, the first lever being movable between a safety position in which the trigger abutment surface inhibits actuation of the trigger, and a use position in which the trigger abutment surface permits actuation of the trigger.

In some embodiments, the second lever includes a first end, an opposite second end, and a second trigger abutment surface, the second lever being movable between a safety position in which the second trigger abutment surface inhibits actuation of the trigger, and a use position in which the trigger abutment surface permits actuation of the trigger.

The disclosure provides, in another independent aspect, a circular saw including a shoe, a shoe plate, a saw unit, and a trim angle adjustment mechanism. The shoe includes an upper surface and an opposite, lower surface defining a shoe plane, the shoe including a groove extending from the lower surface towards the upper surface, the groove configured to engage a track to permit sliding of the shoe along the track. The shoe plate extends upward from the upper surface of the shoe. The saw unit includes a circular saw blade defining a blade plane, and the saw unit is coupled to the shoe by the shoe plate. The trim angle adjustment mechanism is operable to adjust a trim angle between a trim axis formed at an intersection of the blade plane and the shoe plane and a reference trim axis, the reference trim axis being parallel to the groove. The trim angle is adjustable to align the trim axis with the reference trim axis in response to sliding movement of the shoe plate relative to the shoe, the sliding movement caused by adjustment of the trim angle adjustment mechanism.

In some embodiments, the trim angle adjustment mechanism is a set screw threaded to the shoe and in contact with the shoe plate.

In some embodiments, the shoe plate is positioned adjacent a rear of the circular saw.

In some embodiments, the circular saw further comprises a second shoe plate positioned adjacent a front of the circular saw and a second trim angle adjustment mechanism configured to adjust the trim angle.

The disclosure provides, in another independent aspect, a circular saw including a shoe, a saw unit, a depth guide, and a depth stop. The shoe includes an upper surface and an opposite, lower surface. The saw unit includes a circular saw blade, and the saw unit is pivotably coupled to the shoe between a first position in which the saw blade does not protrude beyond the lower surface of the shoe, and a second position in which the saw blade protrudes beyond the lower surface of the shoe. The depth guide extends from the upper surface of the shoe. The depth stop includes a button, a plunger, and a spring. The button has a cam surface. The plunger has a cam engaging surface which engages the cam surface. The spring biases the plunger towards the depth guide. The button and the plunger are movable between a first position, in which the plunger is locked to the depth guide, and a second position, in which the plunger is movable along the depth guide to a location coinciding with a desired cutting depth of the saw blade relative to the lower surface of the shoe. The spring biases one of the button and the plunger toward the first position.

In some embodiments, the circular saw further comprises a carriage coupled to the depth guide, the carriage including teeth, and wherein the plunger includes teeth engageable with the teeth of the carriage.

In some embodiments, in the first position, the teeth of the plunger are engaged with the teeth of the carriage, and in the second position, the teeth of the plunger are disengaged with the teeth of the carriage.

In some embodiments, in the second position, the depth stop is slidable along the depth guide to the location.

In some embodiments, the location relates to a desired depth of cut of the saw blade not equal to any of a scoring depth, a maintenance depth corresponding with a blade exchange, and a full plunge depth.

In some embodiments, the depth stop includes indicia corresponding to the desired depth of cut.

The disclosure provides, in another independent aspect, a circular saw including a shoe, a saw unit, and a bevel angle adjustment mechanism. The shoe includes an upper surface and an opposite, lower surface defining a shoe plane. The saw unit includes a circular saw blade defining a blade plane, the saw unit pivotably coupled to the shoe between a first position in which the saw blade does not protrude beyond the lower surface of the shoe, and a second position in which the saw blade protrudes beyond the lower surface of the shoe. The bevel angle adjustment mechanism is operable to adjust a bevel angle within a bevel angle range about a bevel axis between the saw unit and the shoe. The bevel angle adjustment mechanism includes a linkage and an extended bevel knob. The linkage is operable to shift between a first position and a second position. In the first position of the linkage, a lower bound of the bevel angle range is restricted to a first lower bound. In the second position of the linkage, the lower bound of the bevel angle range is restricted to a second lower bound lower than the first lower bound. The extended bevel knob is operable to shift between a first position and a second position. In the first position of the extended bevel knob, an upper bound of the bevel angle range is restricted to a first upper bound. In the second position of the extended bevel knob, the upper bound of the bevel angle range is restricted to a second upper bound greater than the first upper bound.

In some embodiments, the linkage and the extended bevel knob are operable independent of one another.

In some embodiments, the extended bevel knob is accessible from a longitudinal end of the circular saw.

In some embodiments, the linkage includes a hole, an in the first position of the linkage, the linkage is supported by a set screw, and the set screw is misaligned with the hole. In the second position of the linkage, the set screw is aligned with the hole and receivable therein.

In some embodiments, the linkage is biased by a spring to the first position.

In some embodiments, the circular saw further comprises a carriage coupled to the saw unit, the carriage including a carriage plate configured to adjustably position the saw unit relative to the shoe, the carriage plate having an arcuate slot with a stop surface, and the extended bevel knob includes a shaft having a flat surface, the shaft being movable between the first position and the second position.

In some embodiments, in the first position of the extended bevel knob, the flat surface faces away from the stop surface, and in the second position of the extended bevel knob, the flat surface faces the stop surface.

In some embodiments, the shaft is generally cylindrical, and the flat surface is between axial ends of the generally cylindrical shaft.

In some embodiments, the carriage is adjustable relative to the shoe to move the saw unit between a position corresponding to any desired bevel angle between the second lower bound and the second upper bound.

In some embodiments, while adjusting the carriage relative to the shoe, the shaft is movable in the arcuate slot relative to the stop surface.

In some embodiments, the extended bevel knob is rotatable between the first position and the second position.

Other features and aspects of the disclosure will become apparent by consideration of the following detailed description and accompanying drawings.

Figure 1:
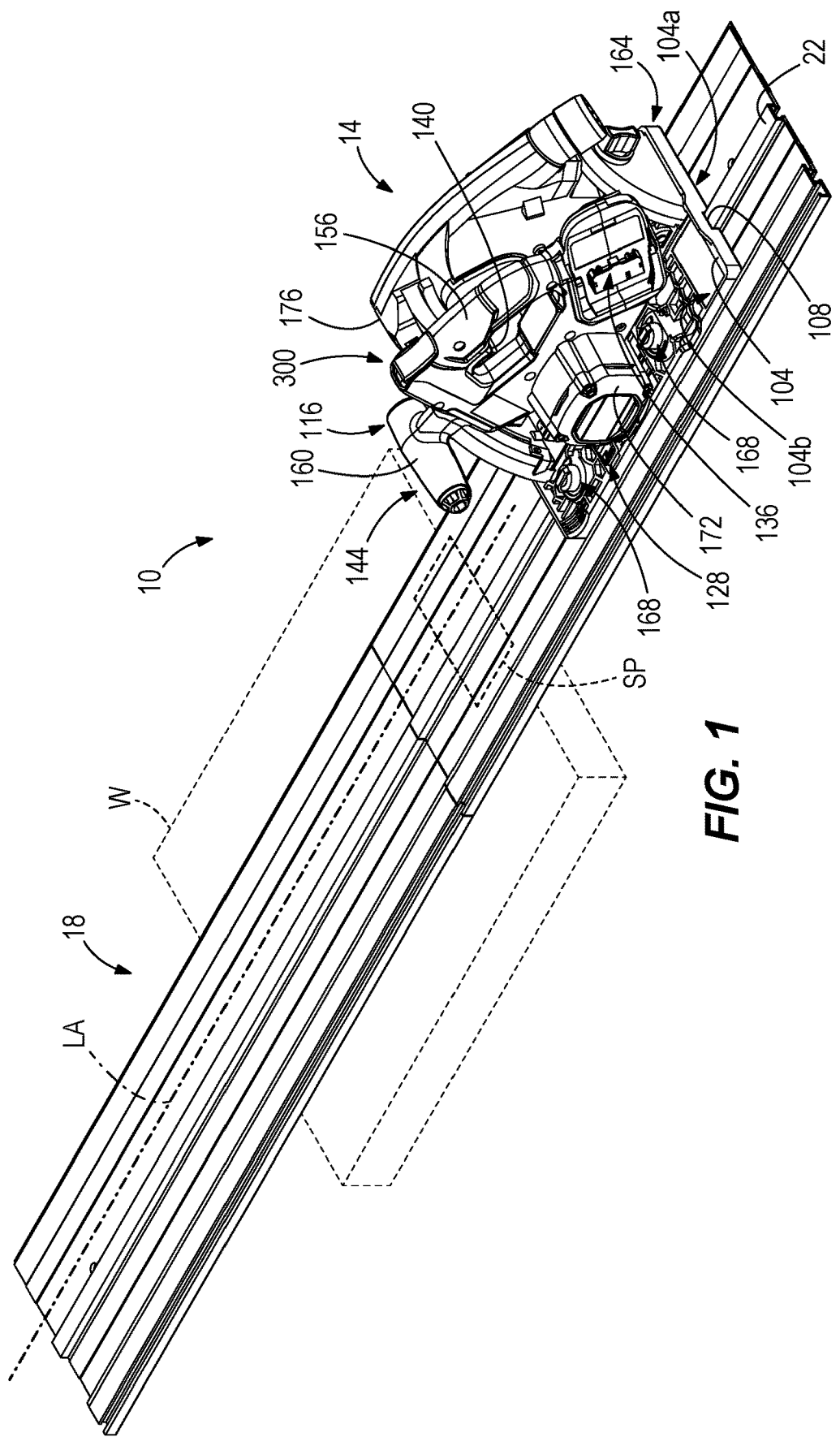
FIG. 1 is a perspective view of a track saw assembly including a track and a saw slidably supported upon the track.

Before any embodiments of the invention are explained in detail, it is to be understood that the invention is not limited in its application to the details of construction and the arrangement of components set forth in the following description or illustrated in the following drawings. The invention is capable of other embodiments and of being practiced or of being carried out in various ways Features illustrated or described as part of one embodiment can be used with another embodiment to yield a still further embodiment. Thus, it is intended that the present disclosure covers such modifications and variations as come within the scope of the appended claims and their equivalents. The detailed description uses numerical and letter designations to refer to features in the drawings. Like or similar designations in the drawings and description have been used to refer to like or similar parts of the invention.

As used herein, the terms "first", "second", and "third" may be used interchangeably to distinguish one component from another and are not intended to signify location or importance of the individual components. The singular forms "a," "an," and "the" include plural references unless the context clearly dictates otherwise. The terms "coupled," "fixed," "attached to," and the like refer to both direct coupling, fixing, or attaching, as well as indirect coupling, fixing, or attaching through one or more intermediate components or features, unless otherwise specified herein. As used herein, the terms "comprises," "comprising," "includes," "including," "has," "having" or any other variation thereof, are intended to cover a non-exclusive inclusion. For example, a process, method, article, or apparatus that comprises a list of features is not necessarily limited only to those features but may include other features not expressly listed or inherent to such process, method, article, or apparatus. Further, unless expressly stated to the contrary, "or" refers to an inclusive-or and not to an exclusive-or. For example, a condition A or B is satisfied by any one of the following: A is true (or present) and B is false (or not present), A is false (or not present) and B is true (or present), and both A and B are true (or present).

Terms of approximation, such as "generally," "approximately," or "substantially," include values within ten percent greater or less than the stated value. When used in the context of an angle or direction, such terms include within ten degrees greater or less than the stated angle or direction. For example, "generally vertical" includes directions within ten degrees of vertical in any direction, e.g., clockwise or counter-clockwise.

Benefits, other advantages, and solutions to problems are described below with regard to specific embodiments. However, the benefits, advantages, solutions to problems, and any feature(s) that may cause any benefit, advantage, or solution to occur or become more pronounced are not to be construed as a critical, required, or essential feature of any or all the claims.

DETAILED DESCRIPTION

FIG. 1 illustrates a track saw assembly 10 including a saw 14 and a track 18. The track 18 rests upon a workpiece W. The track 18 includes a channel 22, and the saw 14 includes a shoe 104 having a groove 108. The shoe 104 defines a shoe plane SP on a lower surface 104a thereof which generally rests upon the track 18. The shoe 104 has an opposite upper surface 104b. The groove 108 engages the channel 22, and the saw 14 is translatable along a longitudinal axis LA of the track 18 to make a straight cut in the workpiece W. In some instances, the channel 22 may engage other mechanisms (e.g., clamps) for use with the track saw assembly 10. The saw 14 further comprises a saw unit 116 and a blade guard 120. The blade guard 120 extends upward from the shoe 104. The saw unit 116 includes a motor 124 (FIG. 3) located inside a motor housing 128. The motor 124 includes a rotor 124a and a stator 124b. The rotor 124a of the motor 124 is drivably coupled to a blade B by an arbor 132 (FIG. 12) with the blade B being positioned at least partially within the blade guard 120. The motor 124 is configured to rotate the blade B in a blade plane BP. The blade plane BP intersects the shoe plane SP.

Figure 3:
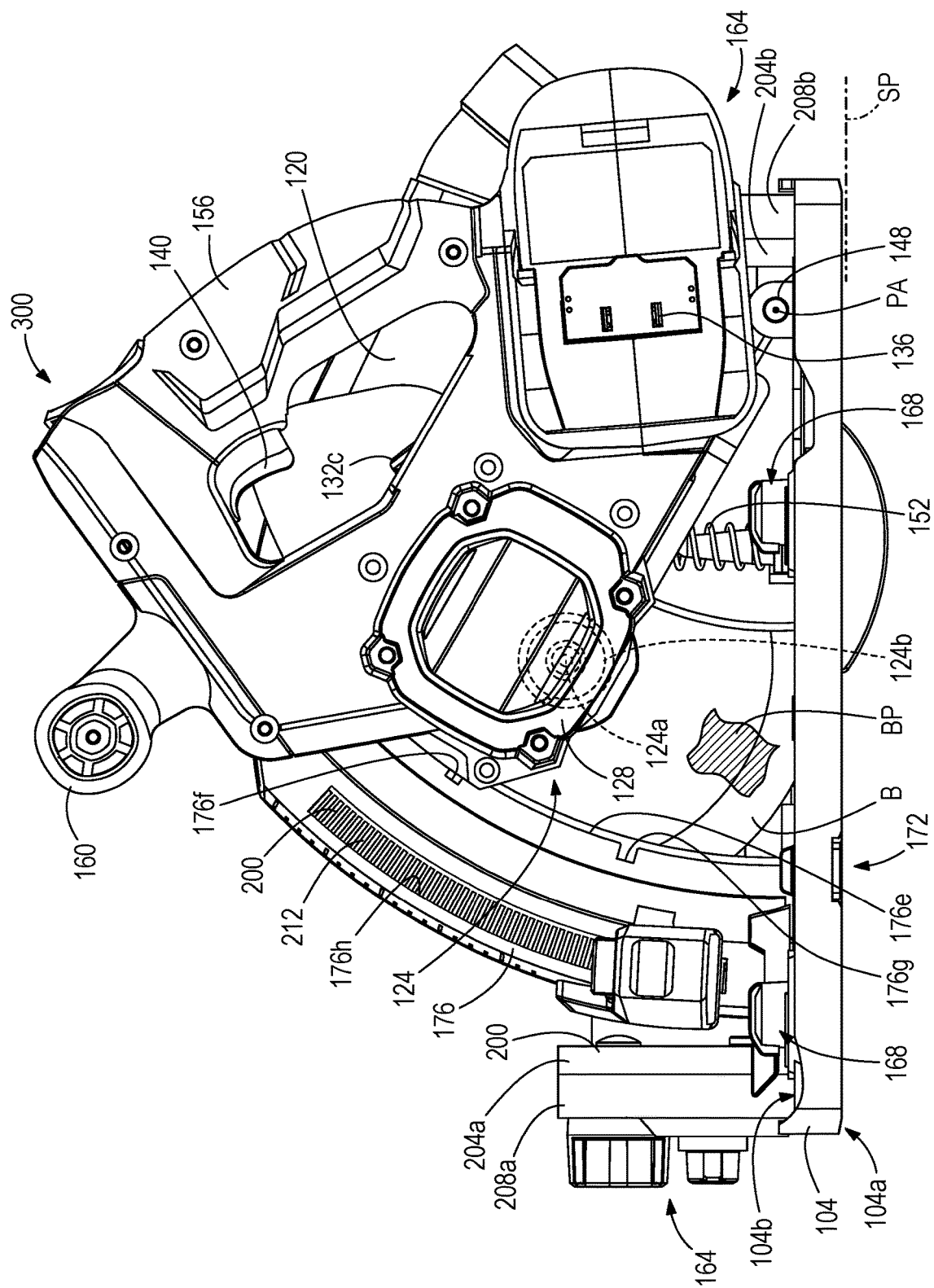
FIG. 3 is an opposite side view of the saw of FIG. 1 with the blade in a plunged position.
Figure 4:
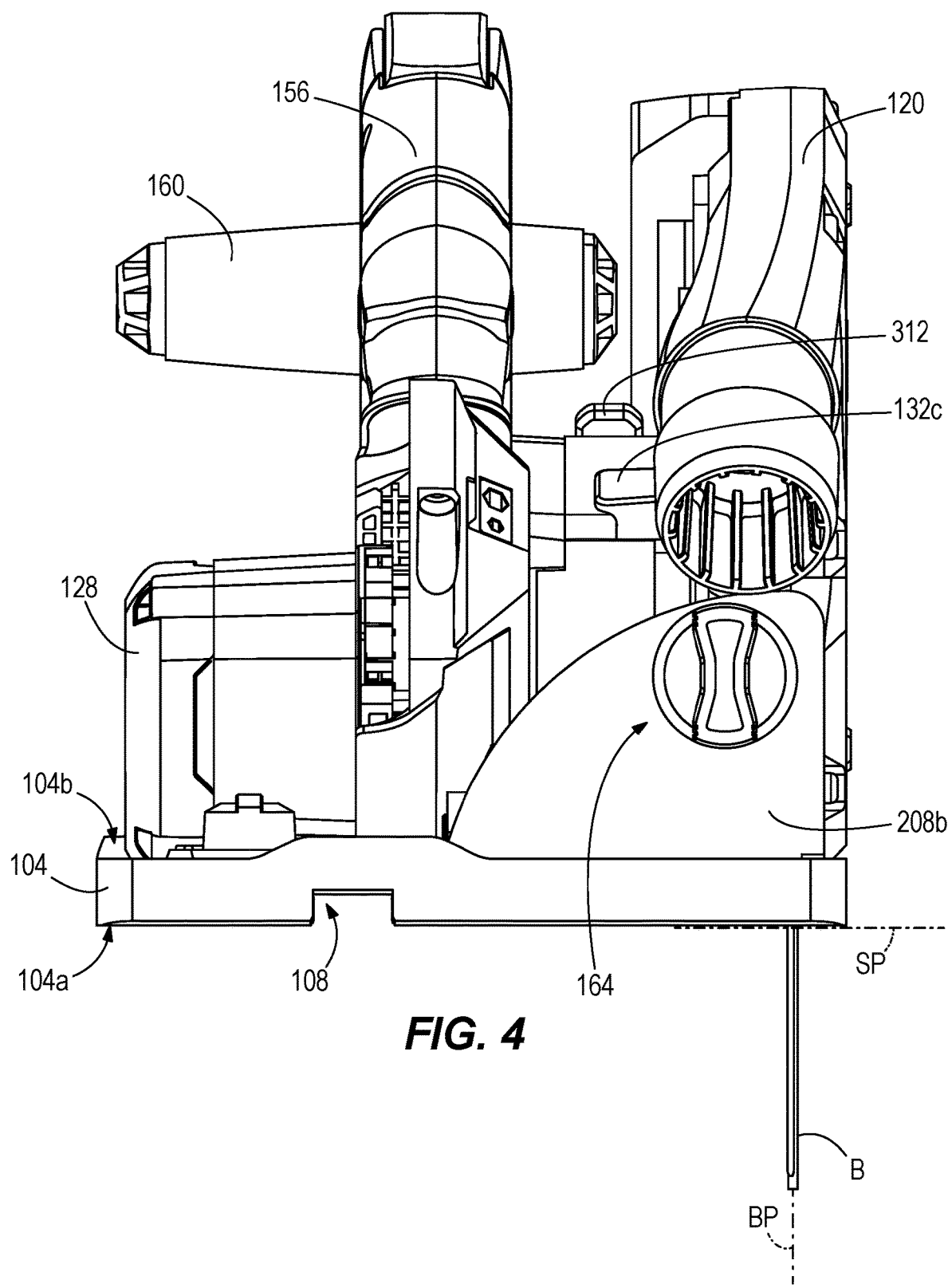
FIG. 4 is a first end view of the saw of FIG. 1.

With reference to FIG. 3, the motor 124 selectively receives power from a power source at a power interface 136. In the illustrated embodiment, the power source may be a battery pack that is selectively coupled to the saw unit 116 at the power interface 136. Such a battery pack may be a rechargeable battery pack. The saw unit 116 further includes a trigger 140. A user operates the trigger 140 to selectively transmit power from the power source (e.g., the battery pack) to the motor 124 to rotate the blade B. The trigger 140 is configured to activate the motor 124 in response to being actuated.

Figure 8:
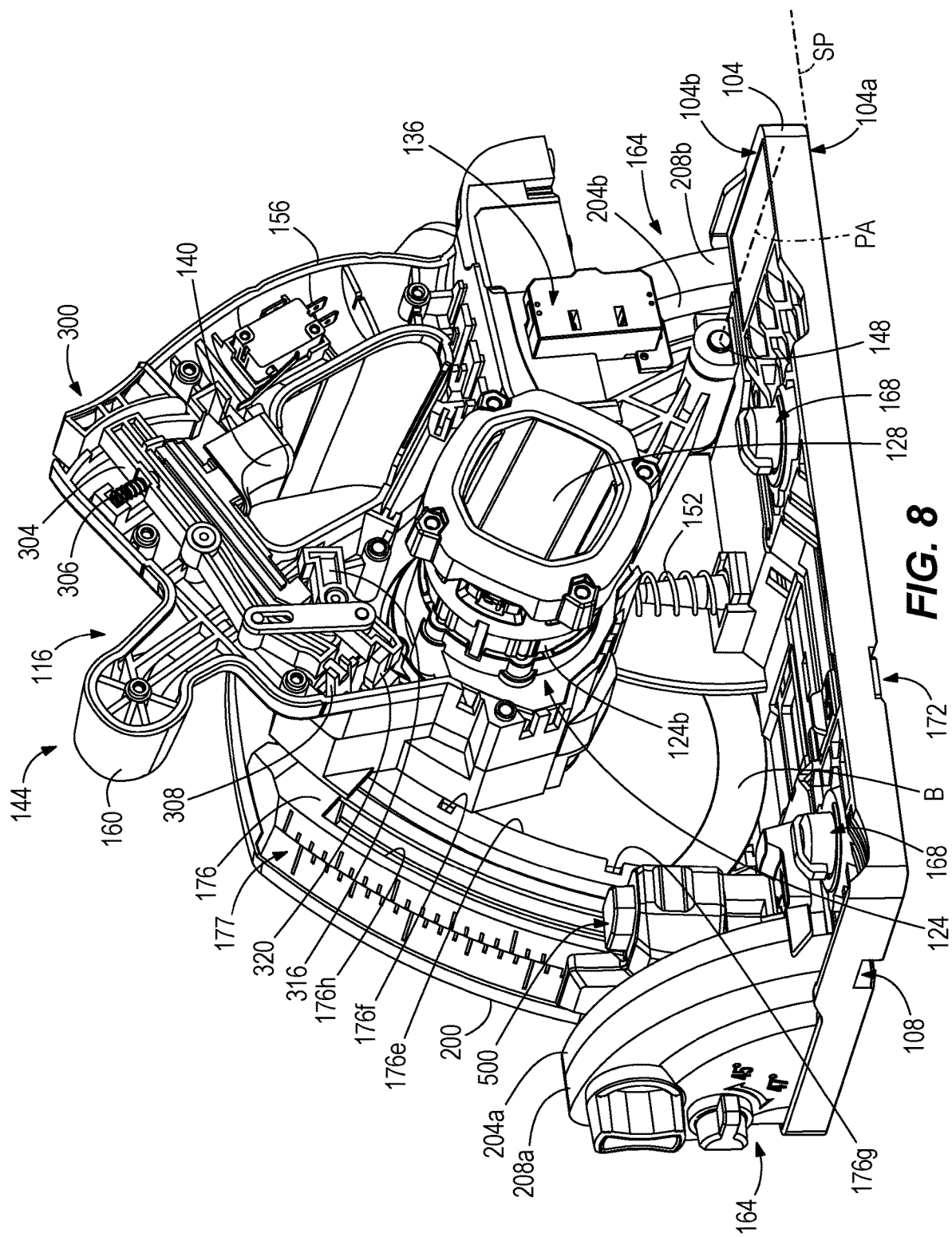
FIG. 8 is a perspective view of the saw of FIG. 1 with a illustrating a lockout mechanism of the saw.

FIG. 8 shows a plunge mechanism 144 of the saw 14. The plunge mechanism 144 is configured to rotate the saw unit 116 relative to the shoe 104 about a plunge axis PA. The plunge axis PA is generally perpendicular to the longitudinal axis LA. Accordingly, the saw unit 116 is movable between a plunged position and a raised position. In the plunged position, the blade B extends below the shoe plane SP and the blade B can make a cut in the workpiece W. In the raised position, the blade B is positioned entirely above the shoe plane SP such that the blade B is inhibited from contacting the workpiece W. In other words, the saw unit 116 is movable between a plunged position in which at least a portion of the blade B is positioned below the shoe 104 and a raised position in which the blade B is positioned above the shoe 104. In an alternate raised position, the blade B is positioned such that an edge (i.e., a lower edge) of the blade B intersects the shoe plane SP. The saw unit 116 includes the motor 124 and the motor housing 128. Accordingly, the motor housing 128 is pivotably coupled to the shoe 104 about the plunge axis PA between a raised position in which the blade B is located above the shoe 104 and a plunged position in which at least a portion of the saw blade B is located beneath the shoe 104. In transitioning between the raised position and the plunged position, an edge (i.e., a lower edge) of the blade B may come into intersection with the shoe plane SP. In this state, the edge (i.e., the lower edge) of the blade B is neither below nor above the shoe plane SP. Alternatively, the motor housing 128 may be pivotably coupled to the shoe 104 about the plunge axis PA between the alternate raised position in which the edge (i.e., the lower edge) of the blade B intersects the shoe plane SP and a plunged position in which at least a portion of the blade B is located beneath the shoe.

The plunge mechanism 144 includes a pivot pin 148 and a spring 152. The pivot pin 148 pivotably couples the saw unit 116 to the shoe 104. The pivot pin 148 is oriented along the plunge axis PA. The spring 152 biases the saw unit 116 and thus the motor housing 128 away from the shoe 104. In other words, the spring 152 biases the saw unit 116 and thus the motor housing 128 to the raised position. During typical use, a user may grasp at least one of a primary handle 156 and a secondary handle 160 to plunge the saw unit 116 from the raised position towards the plunged position against the bias of the spring 152. Upon the user's release of the primary handle 156 and/or the secondary handle 160, the spring 152 returns the saw unit 116 to the raised position.

As will be discussed in detail below, the saw 14 includes a lockout mechanism 300 which selectively permits actuation of the trigger 140. The lockout mechanism 300 also selectively permits plunging of the saw unit 116 via the plunge mechanism 144.

Figure 2:
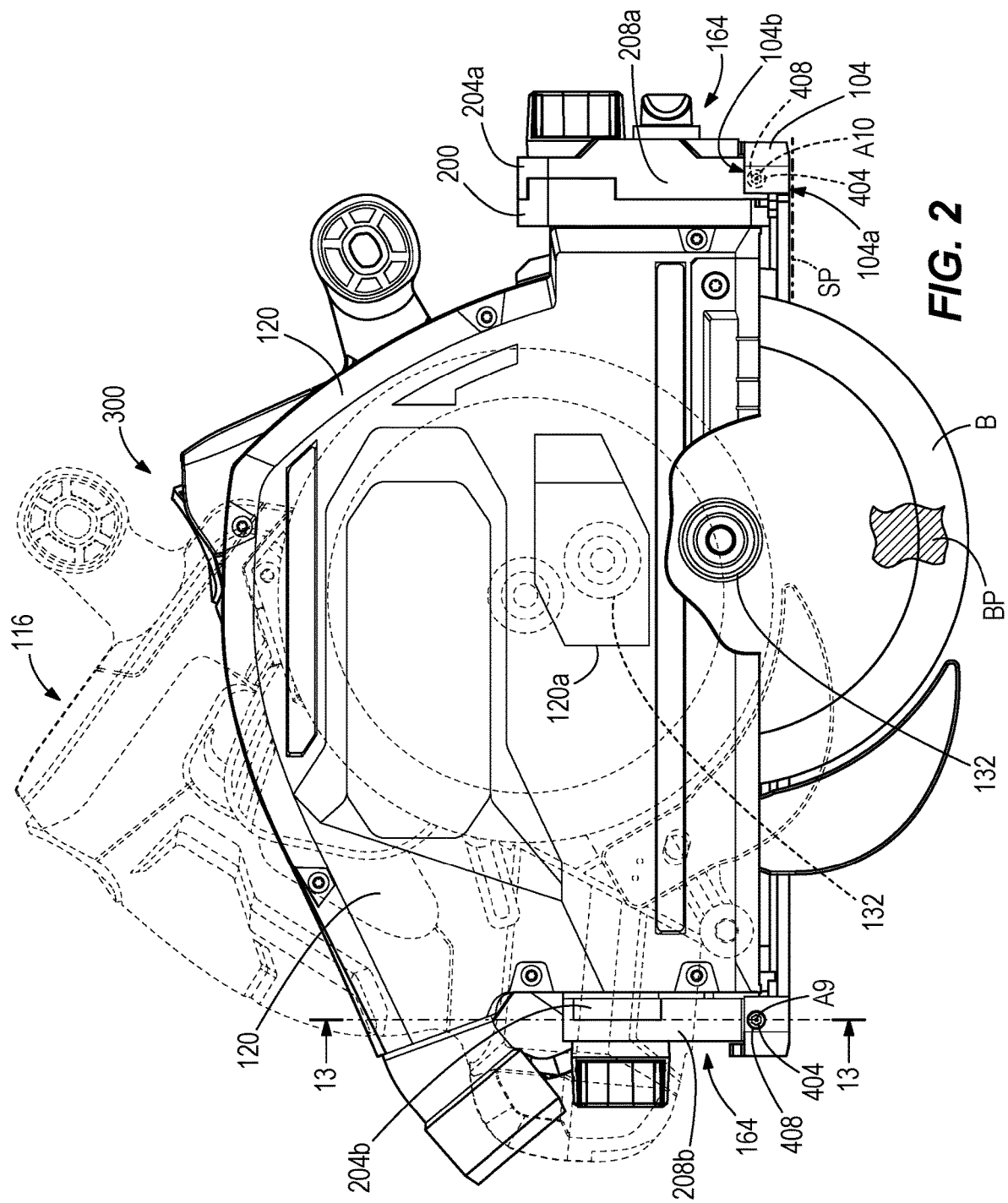
FIG. 2 is a side view of the saw of FIG. 1 with the blade in a fully plunged position.
Figure 5:
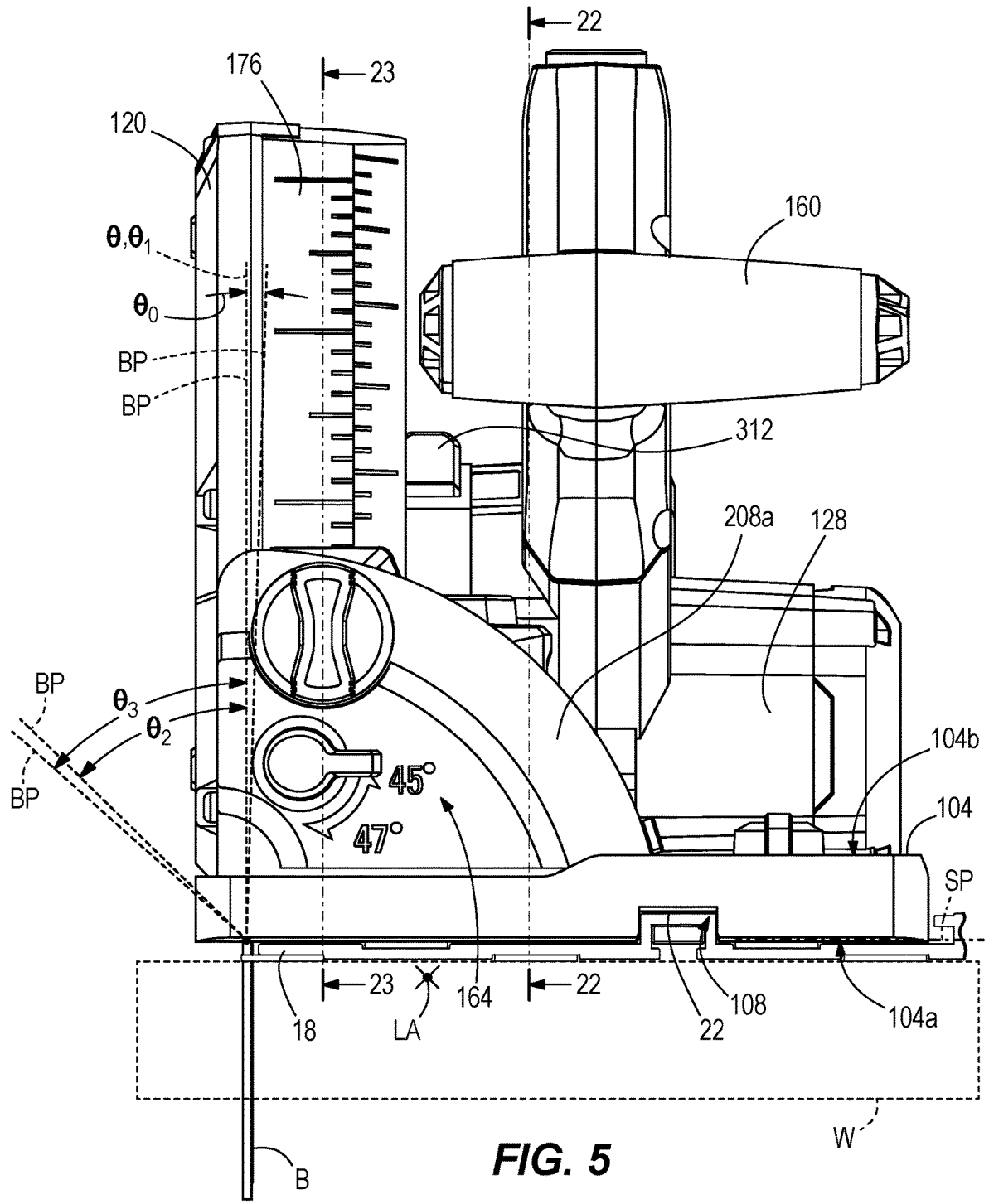
FIG. 5 is a second end view of the track saw assembly of FIG. 1.

As illustrated in at least FIGS. 5 and 18-25, and as described in detail below, the saw 14 includes a bevel mechanism 164 configured to rotate the saw unit 116 relative to the shoe 104 about a bevel axis BA. With reference to FIGS. 1 and 2, the saw unit 116 includes a carriage 200 having carriage plates 204a, 204b which cooperate with shoe plates 208a, 208b to form the bevel mechanism 164. The shoe plates 208a, 208b are coupled to the shoe 104, and the carriage 200 rotates about the bevel axis BA to a desired bevel angle θ0, θ1, θ2, and θ3 (FIG. 5). The bevel axis BA is generally parallel to the longitudinal axis LA. Accordingly, the saw unit 116 is movable between an upright (i.e., vertical) position (blade plane BP at bevel angle θ1) relative to shoe plane SP (in FIG. 5) in which the blade B is configured to make a straight cut in the workpiece W and a beveled position (blade planes BP at bevel angles θ0, θ2, and θ3 in FIG. 5) in which the blade B is configured to make a beveled cut in the workpiece W.

Figure 7:
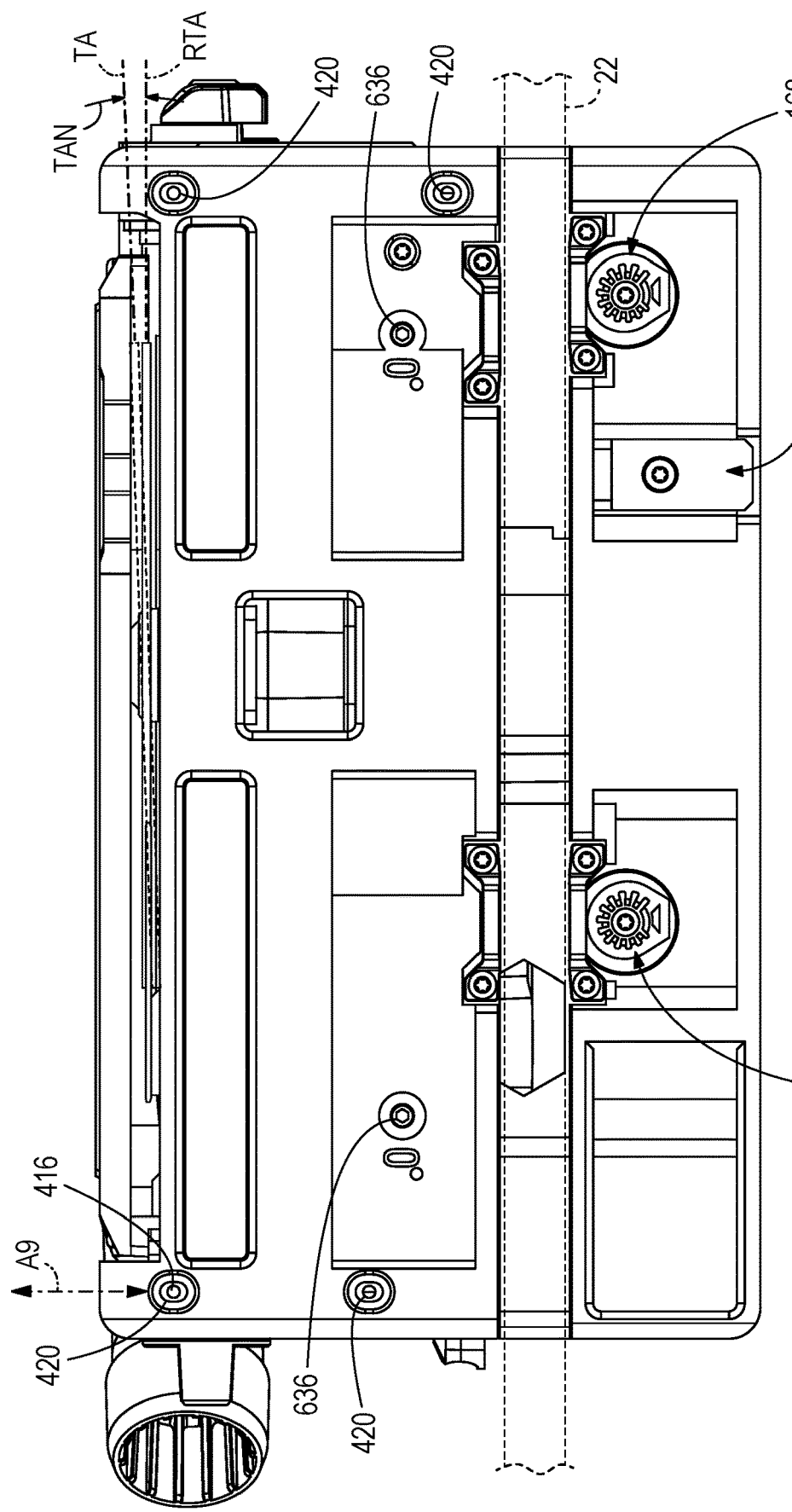
FIG. 7 is a bottom view of the saw of FIG. 1.

FIG. 7 further illustrates that the saw 14 includes track adjustment mechanisms 168 configured to selectively adjust the interface between the groove 108 of the shoe 104 and the channel 22 of the track 18. The track adjustment mechanisms 168 are coupled to the shoe 104. The illustrated saw 14 includes one track adjustment adjacent each longitudinal end of the shoe 104. A user may adjust either of the track adjustment mechanisms 168 while the shoe 104 is supported on the track 18.

FIG. 7 further illustrates that the saw 14 includes an anti-tip mechanism 172 configured to inhibit lifting of the shoe 104 from the track 18. The anti-tip mechanism 172 is coupled to the shoe 104. The anti-tip mechanism 172 may be movable between a retracted position in which the anti-tip mechanism 172 is misaligned with the track 18 and a deployed position in which at least a portion of the anti-tip mechanism 172 is aligned with the track 18 to inhibit lifting of the shoe 104 from the track 18. The anti-tip mechanism 172 is particularly useful to inhibit lifting of the shoe 104 from the track 18 while the saw unit 116 is moved to a beveled position by the bevel mechanism 164.

Finally, FIG. 3 illustrates a depth guide 176 defining a channel 176a in interaction with a depth stop assembly 500. The depth guide 176 is coupled to the blade guard 120. The channel 176a is arcuate in shape (i.e., the channel 176a is an arcuate channel 176a). The channel 176a may have an arc center aligned with the plunge axis PA. As will be described in detail with regard to FIGS. 14-17 below, the depth stop assembly 500 is selectively movable along the channel 176a to provide a plunge stop for the saw unit 116. The depth stop assembly 500 may provide a stop between a fully retracted (e.g., returned to the raised position) position of the blade B and a fully plunged position of the blade B. Indicia 177 (FIG. 8) are provided on the depth guide 176 adjacent the channel 176a. In other words, the indicia 177 form a depth scale. As the depth stop assembly 500 is moved along the depth guide 176, the depth stop assembly 500 and indicia 177 together indicate a corresponding depth of the blade B below the shoe 104.

FIGS. 8-11B and 4 illustrate the lockout mechanism 300 in detail. As most clearly shown in FIG. 8, the lockout mechanism 300 includes a primary lever 304 (i.e., a first lever), a primary plunge stop 308 (i.e., a first plunge stop), a dial 312 coupled to a secondary lever 316, a secondary plunge stop 320, and a connector bar 324. The lockout mechanism 300 is configured to selectively inhibit activation of the trigger 140 along an axis A1, and thus inhibit activation of the motor 124 and corresponding movement (e.g., rotation) of the blade B. The trigger 140 includes a trigger surface 140a, which, in typical use, is acted upon by the user to activate the motor 124. The trigger 140 further includes a first end 140b and an opposite second end 140c. In the illustrated embodiment, the second end 140c is shaped as a hook (e.g., the second end 140c includes a hook).

The primary lever 304 includes a first end 304a and an opposite second end 304b. In the illustrated embodiment, the primary lever 304 includes a trigger abutment surface 304c positioned between the first end 304a and the second end 304b. However, it is envisioned that the trigger abutment surface 304c may be otherwise positioned on the primary lever 304. For example, the trigger abutment surface 304c may be positioned at the first end 304a of the primary lever 304. The first end 304a of the primary lever 304 is accessible from the exterior of the saw 14. In the illustrated embodiment, the first end 304a of the lever 304 is positioned adjacent the trigger surface 140a such that in regular use of the saw 14, an operator may use fingers of the same hand to act upon (e.g., provide force input to) the first end 304a (e.g., by a user's thumb) and the trigger surface 104a (e.g., by a user's index finger). In the illustrated embodiment, the second end 304b is dimensioned as a post. In some embodiments, the second end 304b may be cylindrically shaped. In other embodiments, the second end 304b may be differently shaped. The primary lever 304 further includes a pivot joint 304d aligned with an axis A2. The pivot joint 304d is positioned between the first end 304a and the second end 304b. The pivot joint 304d is configured to permit movement (e.g., rotation) of the primary lever 304 about the axis A2. The primary lever 304 further includes a connecting joint 304e positioned between the pivot joint 304d and the second end 304b. The connecting joint 304e extends along an axis A3. The axis A3 is parallel to the axis A2. In the illustrated embodiment, both the axis A2 and the axis A3 are parallel to the plunge axis PA. It is envisioned that the connecting joint 304e may be otherwise positioned along the primary lever 304. The primary lever 304 further includes a spring receiver 304f. The spring receiver 304f is configured to receive biasing force from a spring 306. In the illustrated embodiment, the spring 306 is a compression spring. In other embodiments, the spring 306 may be another biasing element (e.g., a tension spring, resilient material, etc.). The spring receiver 304f is positioned between the pivot joint 304d and the first end 304a.

The second end 304b of the primary lever 304 is coupled with a first end 308a of the primary plunge stop 308. In the illustrated embodiment, the first end 308a is dimensioned as a bifurcated fork which receives the cylindrical shaft (e.g., the cylinder) of the second end 304b. However, other geometries for coupling these components are possible. The primary plunge stop 308 further includes an opposite second end 308b and a pivot joint 308c located between the first end 308a and the second end 308b. The pivot joint 308c extends along an axis A6, and the pivot joint 304d is configured to permit movement (e.g., rotation) of the primary plunge stop 308 about the axis A6. The axis A6 is angled relative to the axis A2 such that movement of the primary plunge stop 308 is in a different plane when compared to movement of the primary lever 304.

Figure 6:
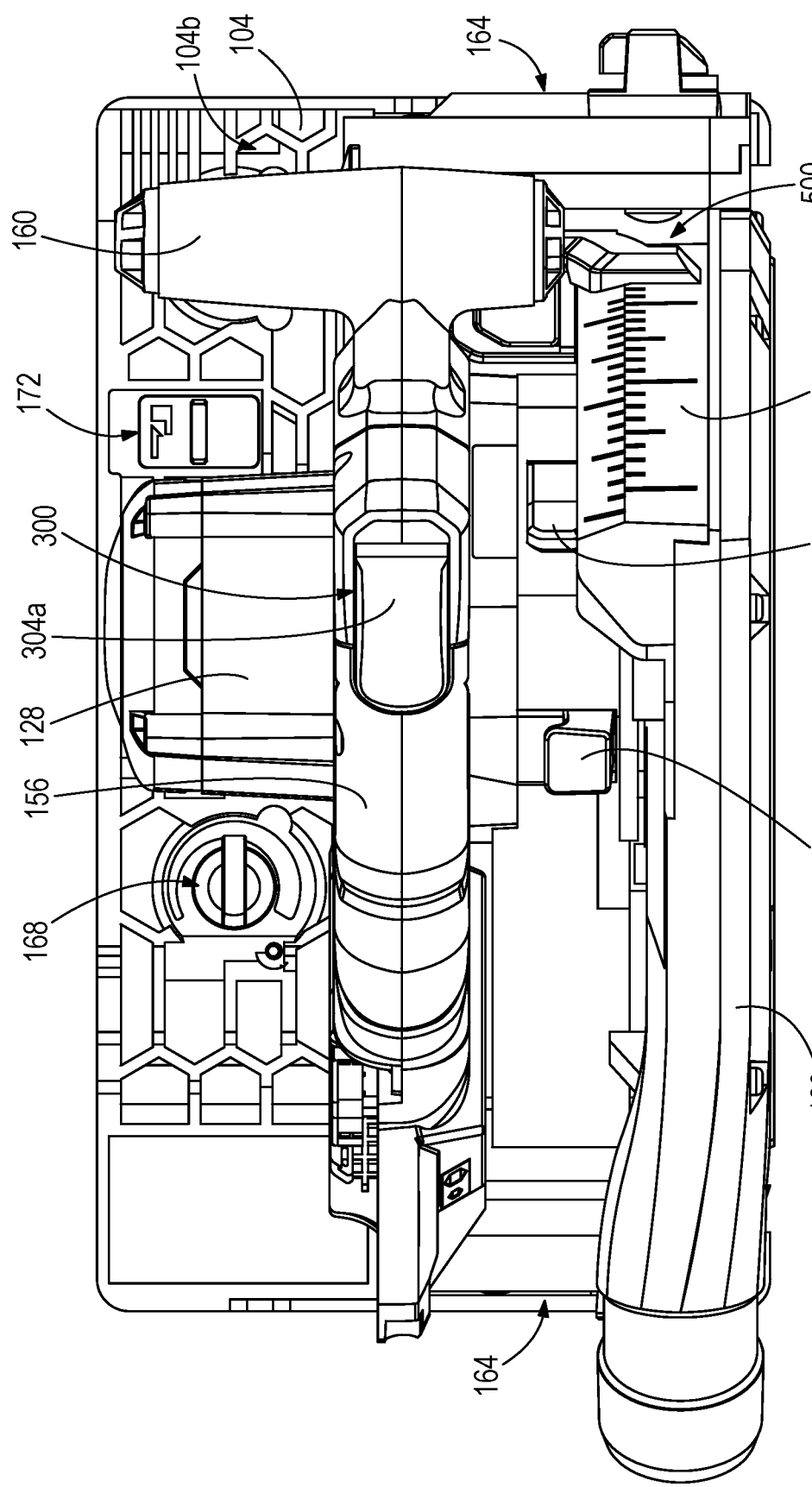
FIG. 6 is a top view of the saw of FIG. 1.
Figure 9:
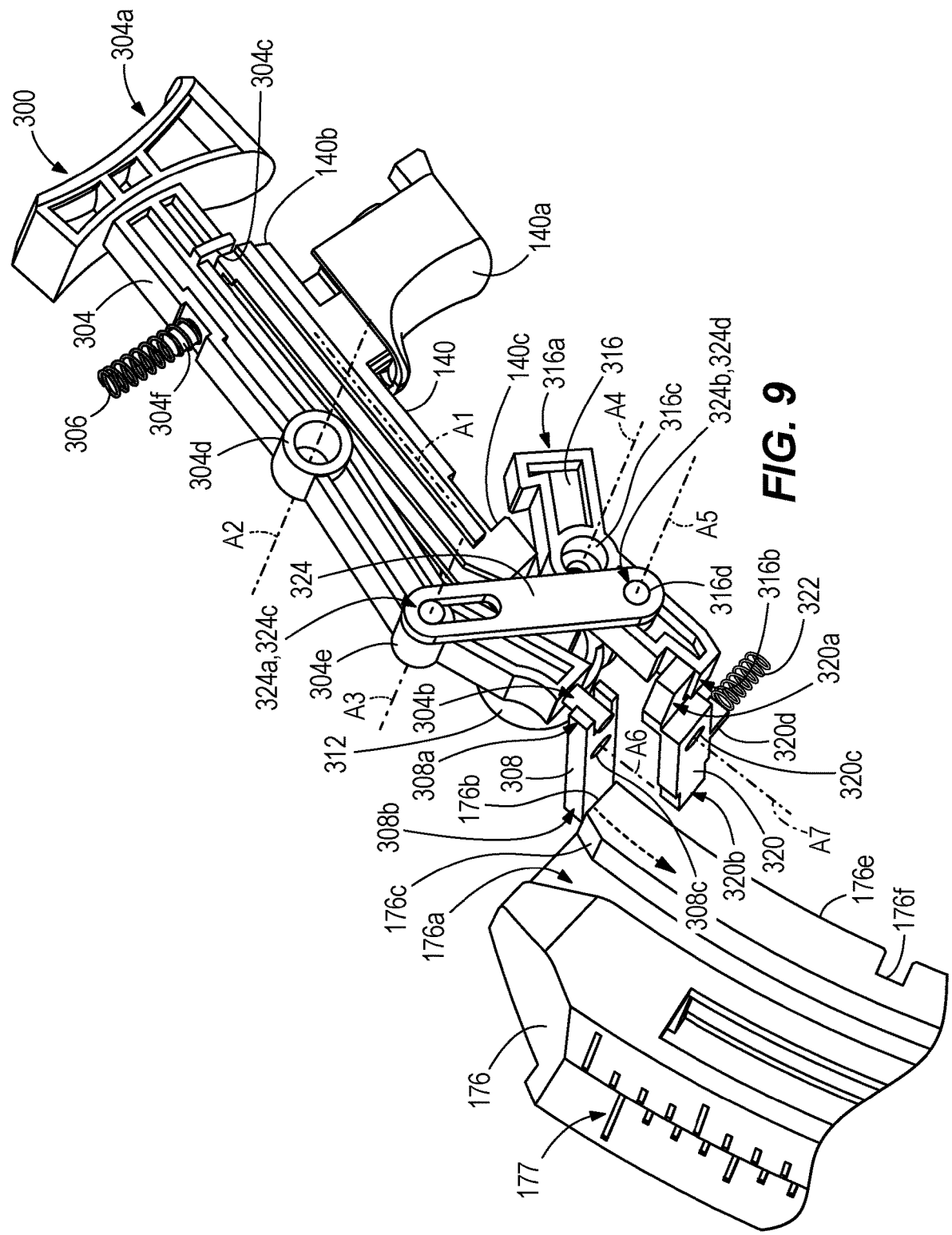
FIG. 9 is the lockout mechanism of FIG. 8 in a home position.

With continued reference to FIG. 9, the dial 312 is coupled to the secondary lever 316. The dial 312 is accessible from the exterior of the saw 14. As illustrated in FIG. 6, the dial 312 is positioned between the blade guard 120 and the primary handle 156. With continued reference to FIG. 9, the secondary lever 316 includes a first end 316a and an opposite second end 316b. In the illustrated embodiment, the first end 316a is dimensioned as a hook configured to engage the hooked second end 140c of the trigger 140 (e.g., the first end 316a includes a hook which functions as a second trigger abutment surface). However, other geometries of the first end 316a and second end 140c are possible. The secondary lever 316 includes a pivot joint 316c which is coupled to the dial 312 and extends along an axis A4. The pivot joint 316c is positioned between the first end 316a and the second end 316b. The secondary lever 316 further includes a connecting joint 316d. In the illustrated embodiment, the connecting joint 316d is positioned between the pivot joint 316c and the second end 316b.

The second end 316b of the secondary lever 316 abuts a first end 320a of the secondary plunge stop 320. The secondary plunge stop 320 further includes an opposite second end 320b and a pivot joint 320c located between the first end 308a and the second end 308b. The pivot joint 320c extends along an axis A7, and the pivot joint 320c is configured to permit rotation of the secondary plunge stop 320 about the axis A7. The axis A7 is generally parallel to the axis A6 of the primary plunge stop 308. Accordingly, movement of the secondary plunge stop 320 is in a different plane as movement of the secondary lever 316. The secondary plunge stop 320 includes a spring receiver 320d which is configured to receiving biasing force a spring 322. In the illustrated embodiment, the spring 322 is a compression spring. In other embodiments, the spring 322 may be another biasing element (e.g., a tension spring, resilient material, etc.). The spring receiver 320d is positioned between the pivot joint 320c and the second end 320b.

Figure 14:
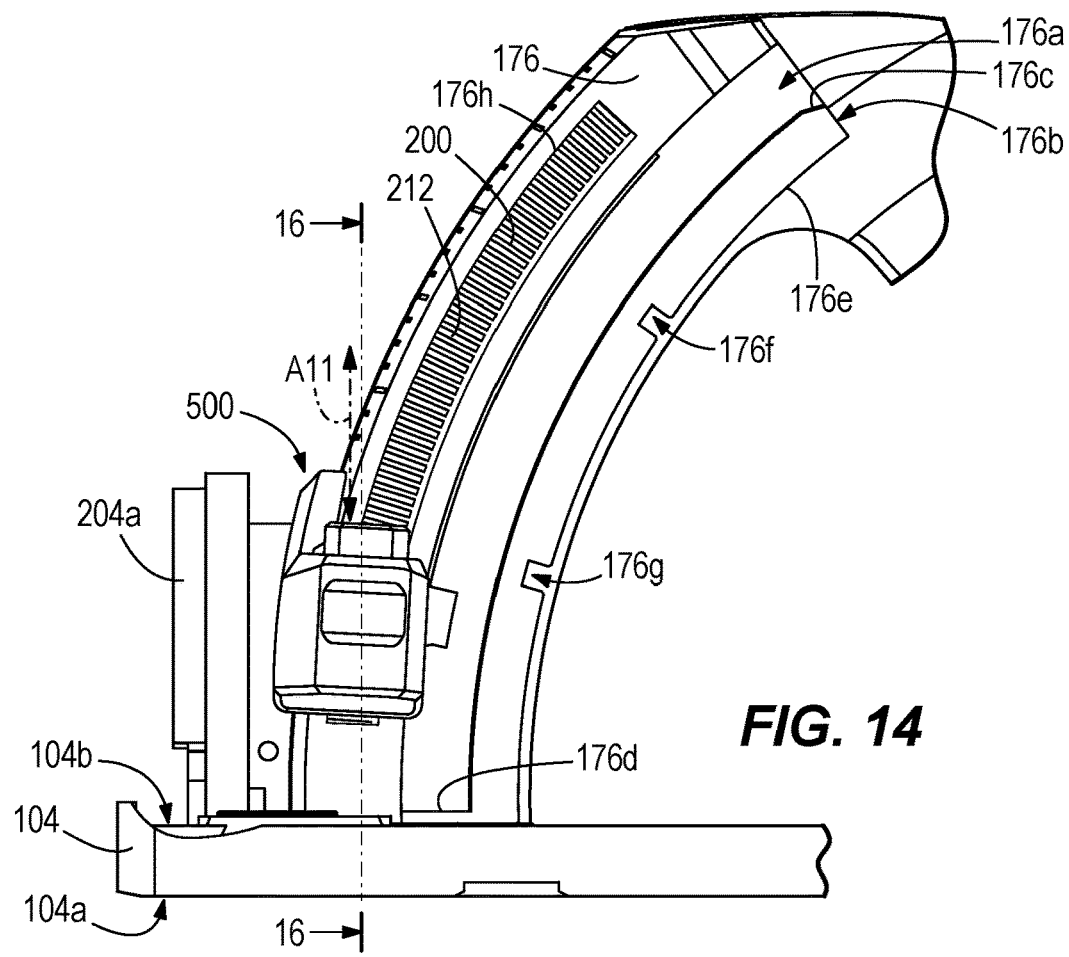
FIG. 14 is a first side view of a depth guide and a depth stop.

As best illustrated in FIG. 14, the depth guide 176 includes a channel 176a dimensioned and open to receive the second end 308b of the primary plunge stop 308. Adjacent the channel 176a, the depth guide 176 includes an abutment surface 176b. Between the channel 176a and the abutment surface 176b, the depth guide 176 includes a ramped surface 176c. The ramped surface 176c is in communication with and angled relative to the opening of the channel 176a. The ramped surface 176c promotes receipt of the primary plunge stop 308 within the channel 176a as the primary plunge stop 308 is brought into alignment with the channel 176a. The channel 176a terminates at an end 176d opposite the opening. The end 176d corresponds with a fully plunged position of the blade B.

The depth guide 176 further includes an inner edge 176e which is arcuate and generally parallel to the channel 176a. As best shown in FIG. 8, the inner edge 176e is a radially inner edge which is closer to the plunge axis PA than the channel 176a. With continued reference to FIG. 14, the inner edge 176e includes a blade exchange recess 176f which extends radially outwardly (relative to the plunge axis PA) from the inner edge 176e towards the channel 176a. The blade exchange recess 176f is positioned along the arcuate length of the inner edge 176e at a position coinciding with a blade exchange depth of the blade B below the shoe 104. The blade exchange depth of the blade B below the shoe 104 may be approximately 1 millimeter to 2 millimeters such that the blade B can make a relatively shallow scoring cut in the workpiece W. In other embodiments, the blade exchange recess 176f may be otherwise positioned to correspond with other desired blade exchange depths (e.g., less than 1 millimeter, above 2 millimeters) and/or common cut depths (e.g., 1 centimeter, etc.). The inner edge 176e also includes a full plunge recess 176g which extends radially outwardly (relative to the plunge axis PA) from the inner edge 176e towards the channel 176a. The full plunge recess 176g is positioned along the arcuate length of the inner edge 176e at a position coinciding with a maintenance depth of the blade B below the shoe 104. The maintenance depth may correspond to a depth in which the arbor 132 is accessible via a window 120a (FIG. 2) in the blade guard 120. This may locate the blade B below the shoe 104 a significant amount (e.g., greater than 3 centimeters) such that the blade B may be positioned on a flat surface (e.g., the workpiece W) for maintenance of the saw 14.

FIG. 9 illustrates a safety position (i.e., a "home" position) of the lockout mechanism 300. In the safety position, the trigger abutment surface 304c of the primary lever 304 is aligned with the first end 140b of the trigger 140 to inhibit actuation of (i.e., "lock out") the trigger 140 along the axis A1. As viewed in FIG. 9, the spring 306 biases (e.g., presses) the primary lever 304 in a clockwise direction about the axis A2 formed by the pivot joint 304d to the safety position. The first end 304a is lowered in the safety position, and the second end 304b is raised in the safety position. In the safety position, the primary plunge stop 308 is aligned with the abutment surface 176b to inhibit plunging of the saw unit 116 via the plunge mechanism 144. In the safety position, the blade B is held in a retracted position in which the blade B does not protrude below the shoe 104. Broadly speaking, the safety position of the lockout mechanism 300 disables operation of the motor 124 because the trigger 140 is inhibited from being actuated.

Figure 10:
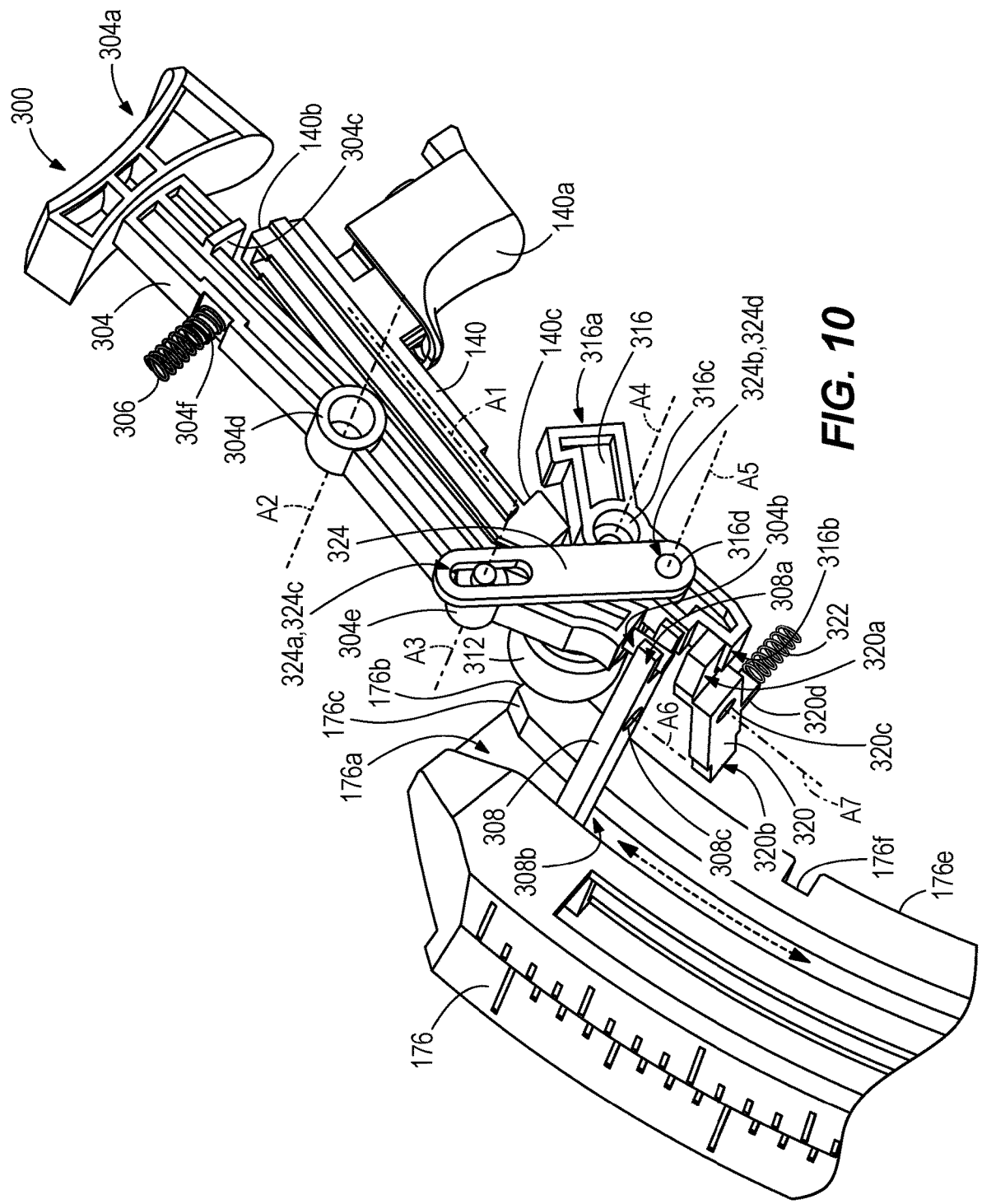
FIG. 10 is the lockout mechanism of FIG. 8 in an ordinary use position.

FIG. 10 illustrates a use position of the lockout mechanism 300. In the use position, the first end 304a of the primary lever 304 is raised, and the second end 304b of the primary lever 304 is lowered. The trigger abutment surface 304c of the primary lever 304 is not aligned with the first end 140b of the trigger 140 to permit actuation of the trigger 140 along the axis A1. The second end 308b of the primary plunge stop 308 is aligned with the channel 176a such that the primary plunge stop 308 permits plunging of the saw unit 116 via the plunge mechanism 144. Once aligned with the channel 176a, the primary plunge stop 308 and thus the saw unit 116 can be plunged (e.g., the saw unit 116 is plungeable) towards the end 176d of the channel 176a. Broadly speaking, the use position of the lockout mechanism enables operation of the saw 14 because the trigger 140 is permitted to be actuated to operate the motor 124 and the saw unit 116 is permitted to plunge.

To transition the lockout mechanism 300 to the use position from the safety position, the first end 304a of the primary lever 304 is acted upon (e.g., by input force from a user) to rotate the primary lever 304 about the axis A2. As illustrated in FIGS. 9 and 10, during a transition from the safety position to the use position, the primary lever 304 rotates in a counterclockwise direction about the axis A2. This counteracts the biasing force of the spring 306 such that the spring 306 is loaded in the use position.

Once in the use position, and at least partially plunged towards the end 176d, the primary plunge stop 308 will remain within the channel 176a, and the lockout mechanism 300 remains in the use position until the saw unit 116 is raised to the safety position by the spring 152 of the plunge mechanism 144. While in such a partially plunged use position, the act upon the first end 304a of the primary lever 304 may be released (e.g., the user can release the input force on the first end 304a), and the lockout mechanism 300 remains in the use position where the trigger 140 is actuatable and the primary plunge stop 308 permits plunging of the saw unit 116. In this partially plunged use position with the first end 304a not acted upon (e.g., no input force on the primary lever 304), the spring 306 biases the primary plunge stop 308 via the primary lever 304 against the channel 176a and in a direction towards the inner edge 176e. Once the spring 152 acts upon the plunge mechanism 144 to fully retract the saw unit 116, the primary plunge stop 308 slips out of the channel 176a, and is forced by unloading of the spring 306 into alignment with the abutment surface 176b, and the lockout mechanism 300 will remain in the safety position. In short, the lockout mechanism 300 is configured to, once at least partially plunged, remain in the use position even after the acting force which placed the lockout mechanism 300 in the use position is removed. The lockout mechanism 300 and plunge mechanism 144 are configured to bias the lockout mechanism 300 to the safety position when in the user position and at least partially plunged.

In both the safety position (FIG. 9) and the use position (FIG. 10), the dial 312 is not acted upon, and is biased by the spring 322 to its unloaded position. The second end 320b of the secondary plunge stop 320 is separated from the inner edge 176e. Accordingly, when in the safety position (FIG. 9) and the use position (FIG. 10), the secondary plunge stop is located in a free position where the saw unit 116 is permitted to be moved from the raised position toward the fully plunged position, and the trigger 140 is permitted to be actuated along the axis A1.

The connector bar 324 includes a first end 324a having an elongated slot 324c coupled to the connecting joint 304e of the primary lever 304. The slot 324c is selectively in contact (i.e., in selective engagement, depending on the position of the lockout mechanism 300) with the connecting joint 304e of the first lever 304. The connector bar 324 further includes an opposite second end 324b having a cylindrical hole 324d connected (e.g., coupled) to the connecting joint 316d of the secondary lever 316. In other embodiments, the position of the elongated slot 324c may differ. For example, the elongated slot 324c may be within the secondary lever 316, and the cylindrical hole 324d may be within the primary lever 304.

Figure 11A:
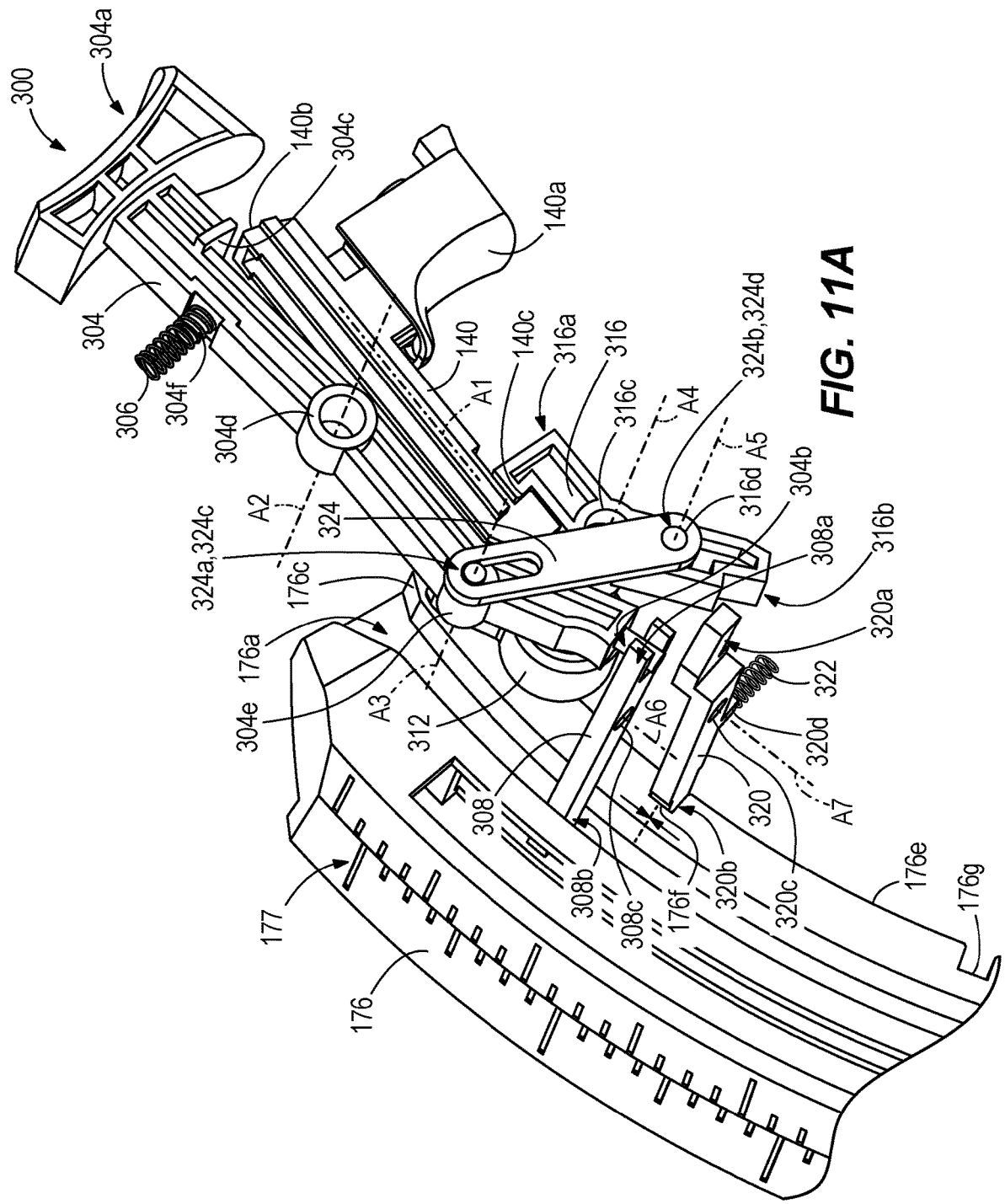
FIG. 11A is the lockout mechanism of IG. 8 in a blade exchange position.

FIG. 11A illustrates a blade exchange position of the lockout mechanism 300 which coincides with the aforementioned blade exchange depth of the blade B. In the blade exchange position, the second end 320b of the secondary plunge stop 320 is positioned within the blade exchange recess 176f. Once located in the blade exchange position, the secondary plunge stop 320 retains the saw unit 116 at the blade exchange depth such that the user may conduct a blade exchange without further or inadvertent plunging or retraction of the saw unit 116. The secondary plunge stop 320 is biased to remain in the blade exchange position by the spring 322. In the blade exchange position, the first end 316a of the secondary lever 316 is aligned with the second end 140c of the trigger 140 to inhibit actuation of (i.e., "lock out") the trigger 140 along the axis A1. In other words, the first end 316a functions as a trigger abutment surface which inhibits actuation of the trigger 140. When rotated out of this position (e.g., as illustrated in FIG. 10), the first end 316a does not inhibit actuation of the trigger 140. In the blade exchange position, the secondary lever 316, connector bar 324, and primary lever 304 locate the primary plunge stop 308 in the channel 176a at a depth corresponding with the blade exchange recess 176f.

Figure 12:
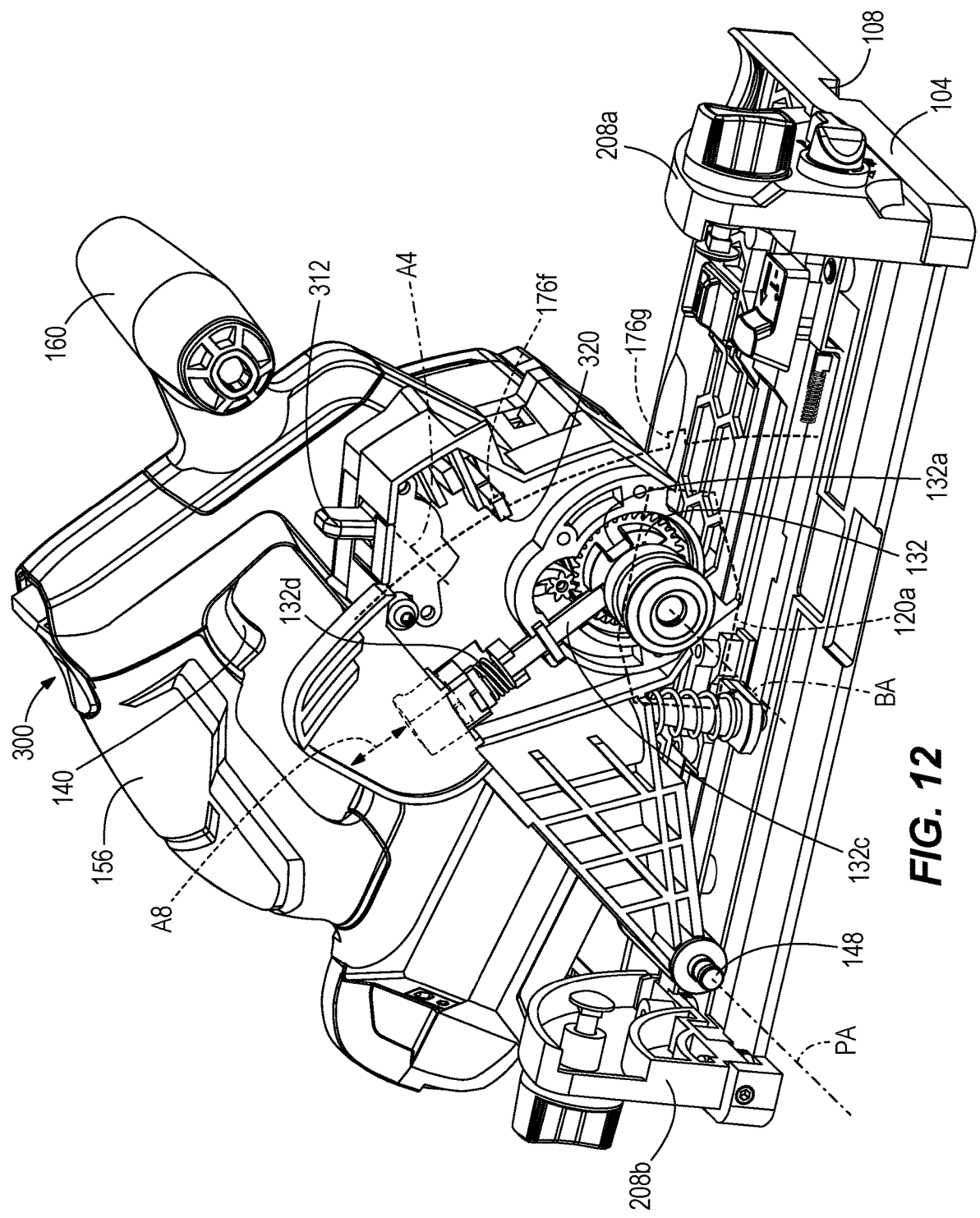
FIG. 12 is a perspective view of the saw.

FIG. 12 illustrates the lockout mechanism 300 in the fully plunged position with the arbor 132 in alignment with the window 120a of the blade guard 120 and in position for a blade exchange. The arbor 132 includes a plurality of notches 132a (e.g., four notches 132a) which are circumferentially spaced from one another. The arbor 132 includes a lock arm 132c which is biased by a spring 132d out of alignment with the notches 132a. When in the fully plunged position, an action can be applied to the lock arm 132c against the bias of the spring 132d and along an axis A8 to position the lock arm 132c in one of the notches 132a. In this position, the arbor 132 can be loosened, and the blade B can be removed along a blade axis BA prior to being passed through the shoe 104. The blade B can be replaced in a reverse operation by the same or another blade B for subsequent use to complete a blade exchange.

To transition the lockout mechanism 300 from the safety position to the blade exchange position, the dial 312 is acted upon (e.g., by input force from a user) to rotate the secondary lever 316 in a counterclockwise direction about the axis A4. As the secondary lever 316 is rotated about the axis A4, the connector bar 324 pulls the connecting joint 304e downwards (as viewed in FIG. 11A). Once rotated, action (e.g., input force) upon the dial 312 is required to be held at least until the saw unit 116 is plunged enough to locate the primary plunge stop 308 in the channel 176a. At this time, the spring 322 is loaded, and further action (e.g., input force) upon the dial 312 is no longer required, as the spring 322 will press the second end 320b of the secondary plunge stop 320 on the inner edge 176e. To reach the blade exchange position, the saw unit 116 must be plunged via the plunge mechanism 144 to locate the second end 320b of the secondary plunge stop 320 in alignment with the blade exchange recess 176f. Once aligned with the blade exchange recess 176f, the spring 322 will unload and bias the second end 320b into the blade exchange recess 176f. The lockout mechanism 300 is configured to, when partially plunged between the blade exchange position and the safety position, be biased toward both the safety position and the blade exchange position even when the acting force (e.g., user input) placed upon the lockout mechanism 300 is removed. Once placed in the blade exchange position, the lockout mechanism 300 is retained in the blade exchange position even after acting (e.g., user input) force upon the lockout mechanism 300 is removed.

Figure 11B:
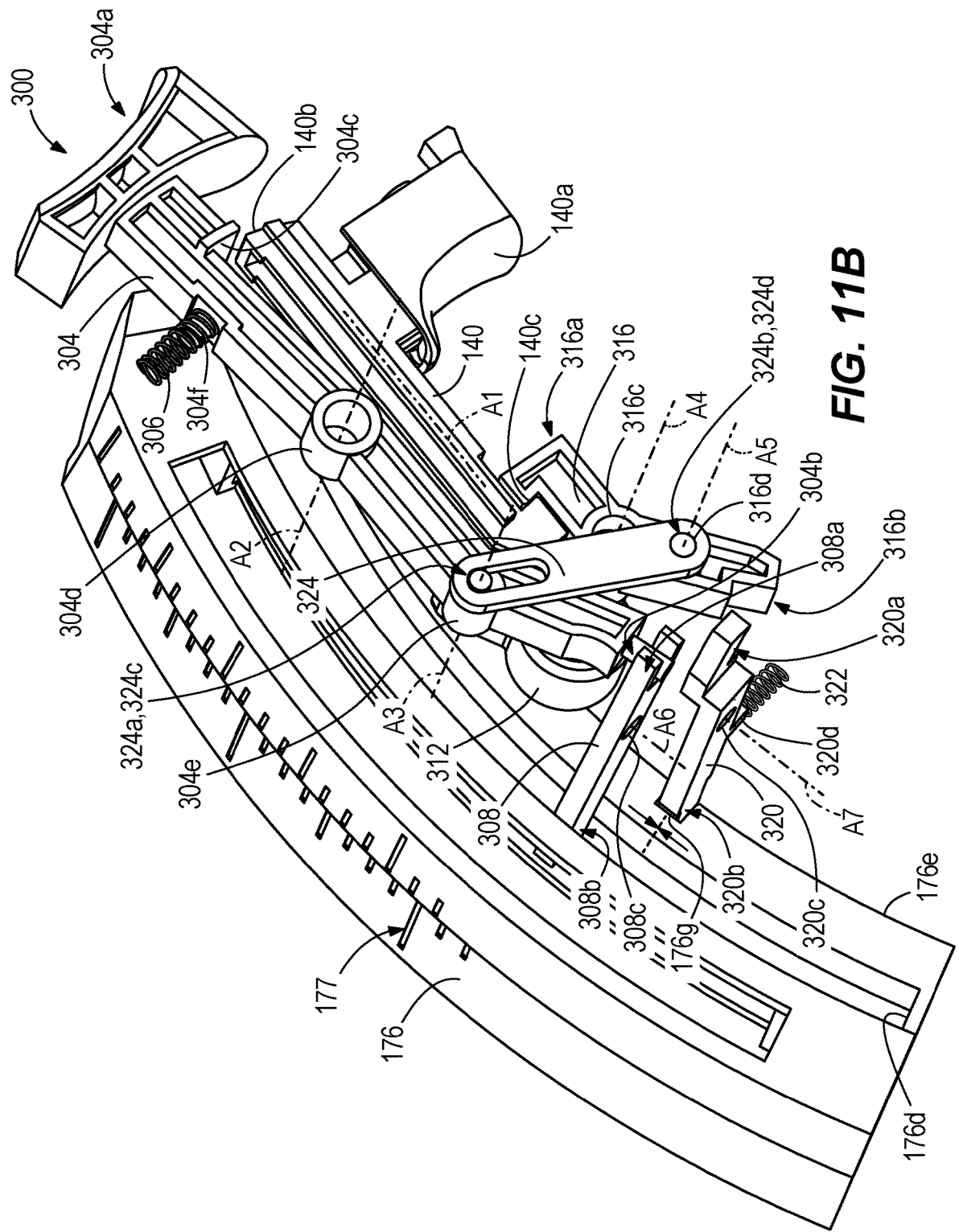
FIG. 11B is the lockout mechanism of FIG. 8 in a fully plunged position.

Removal of the lockout mechanism 300 from the blade exchange position requires another action (e.g., a second action, second user input) on the dial 312 to again load the spring 322. Once action is applied, the lockout mechanism 300 may either retreat to the safety position or advance to the fully plunged position as illustrated in FIG. 11B. In the event that the lockout mechanism 300 retreats to the safety position, the action (e.g., second action, second user input) upon the dial 312 need only be applied when the second end 320b of the secondary plunge stop 320 is aligned with the blade exchange recess 176f. Once retracted beyond the blade exchange recess 176f, action may be released, and the second end 320b of the secondary plunge stop 320 will press against the inner edge 176e until full retraction of the lockout mechanism 300 back to the safety position occurs.

FIG. 11B illustrates a fully plunged position of the lockout mechanism 300 which coincides with the aforementioned maintenance depth of the blade B. In the fully plunged position, the second end 320b of the secondary plunge stop 320 is positioned within the full plunge recess 176g. Also in the fully plunged position, the arbor 132 is positioned in alignment with the window 120a. Once located in the fully plunged position, the secondary plunge stop 320 retains the saw unit 116 at the maintenance depth such that the user may conduct a blade exchange of the blade B and/or trim adjustment of the saw 14 without further or inadvertent plunging or retraction of the saw unit 116. Blade exchange and trim adjustment processes will be explained in detail below. The secondary plunge stop 320 is biased to remain in the fully plunged position by the spring 322. In the fully plunged position, the first end 316a of the secondary lever 316 is aligned with the second end 140c of the trigger 140 to inhibit actuation of (i.e., "lock out") the trigger 140 along the axis A1. In the fully plunged position, the secondary lever 316, connector bar 324, and primary lever 304 locate the primary plunge stop 308 in the channel 176a at a depth corresponding with the full plunge recess 176g.

To transition the lockout mechanism 300 to the fully plunged position from the safety position, the dial 312 is acted upon (e.g., by input force from a user) to rotate the secondary lever 316 in a counterclockwise direction about the axis A4. As the secondary lever 316 is rotated about the axis A4, the connector bar 324 pulls the connecting joint 304e downwards (as viewed in FIG. 11B) to locate the second end 308b in the channel 176a. Once rotated, action (e.g., input force) upon the dial 312 is required to be held at least until the saw unit 116 is plunged enough to locate the primary plunge stop 308 in the channel 176a. At this time, the spring 322 is loaded, and further action (e.g., input force) upon the dial 312 is only required to permit the secondary plunge stop 320 to bypass the blade exchange recess 176f. This action is required because the spring 322 will press the second end 320b of the secondary plunge stop 320 on the inner edge 176e. To reach the fully plunged position, the saw unit 116 must be plunged via the plunge mechanism 144 to locate the second end 320b of the secondary plunge stop 320 in alignment with the full plunge recess 176g. Once aligned with the full plunge recess 176g, the spring 322 will unload and locate the second end 320b within the full plunge recess 176g. The lockout mechanism 300 is configured to, when partially plunged between the fully plunged position and the fully plunged position, be biased toward both the fully plunged position and the safety position even after the acting force on the dial 312 is removed. When in the fully plunged position, the lockout mechanism 300 retains the saw unit 116 in the fully plunged position even after the acting force on the dial 312 is removed.

Removal of the lockout mechanism 300 from the fully plunged position requires another action (e.g., third action, third user input) on the dial 312 to again load the spring 322. Once action is applied, the lockout mechanism 300 may retreat to either the safety position (FIG. 9) or the blade exchange position (FIG. 11A). In the event that the lockout mechanism 300 is desired to be moved to the blade exchange position, the action (e.g., user input) upon the dial 312 need only to be applied when the second end 320b of the secondary plunge stop 320 is aligned with the full plunge recess 176g. Once retracted beyond the full plunge recess 176g, the action on the dial 312 may be released, and the secondary plunge stop 320 will be biased by the spring 322 against the inner edge 176e until the secondary plunge stop 320 is aligned with the blade exchange recess 176f. In the event that the lockout mechanism 300 is desired to be moved to the safety position, the action (e.g., user input) upon the dial 312 needs to be applied while the second end 320b of the secondary plunge stop 320 passes the blade exchange recess 176f such that the secondary plunge stop 320 is not located in the blade exchange position. Once retracted beyond the blade exchange recess 176f, action may be released, and the second end 320b of the secondary plunge stop 320 will press against the inner edge 176e until full retraction of the lockout mechanism 300 back to the safety position occurs.

Figure 13:
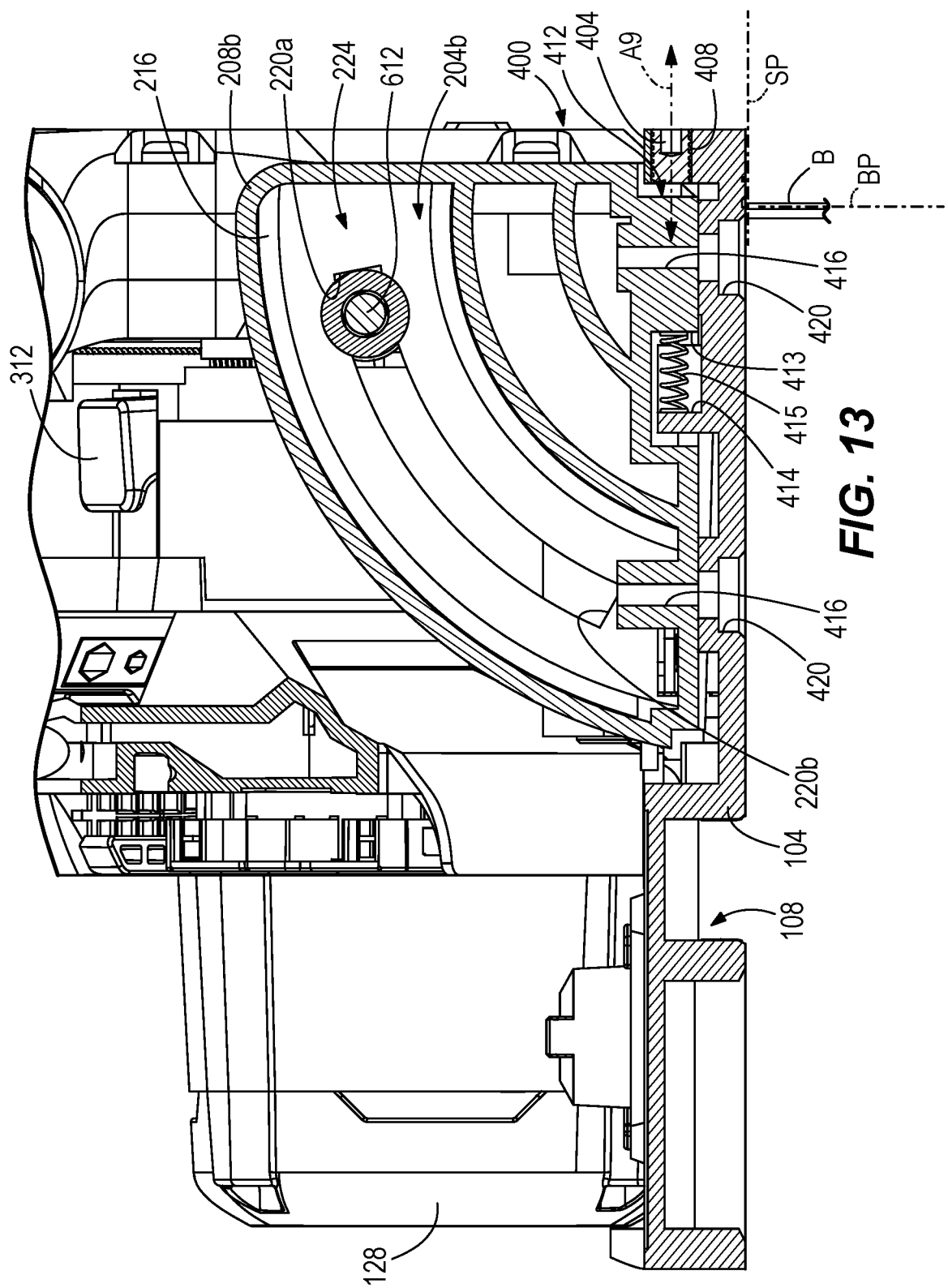
FIG. 13 is a section view of the saw taken along section line 13-13 in FIG. 2.

FIGS. 2, 7, and 13 relate to a trim angle adjustment mechanism 400 which allows for trim adjustment of the blade B relative to the shoe 104. In some contexts, the trim angle adjustment mechanism 400 may be referred to as a "heel angle adjustment mechanism" 400 for heel adjustment. The trim angle adjustment mechanism 400 includes a set screw 404 which is at least partially received in a hole 408 of the shoe 104. The set screw 404 is threaded to the shoe 104. In the illustrated embodiment, the hole 408 is also threaded. In the illustrated embodiment, the hole 408 is a through hole aligned with an axis A9, and the set screw 404 is configured to be moved (e.g., rotated and translated) about the axis A9. The axis A9 is perpendicular to the groove 108 of the shoe 104 and thus the longitudinal axis LA. The illustrated set screw 404 and hole 408 are each threaded. In the illustrated embodiment, the trim angle adjustment mechanism 400 is positioned adjacent the shoe plate 208b which is located at the rear of the saw 14. In other embodiments, the trim angle adjustment mechanism 400 may be located adjacent the shoe plate 208a which is located at the front of the saw 14. Such a trim angle adjustment mechanism 400 at the front of the saw 14 is illustrated in dashed lines in FIG. 2, and may include a set screw 404 and hole 408 generally similar to the trim angle adjustment mechanism 400. In still other embodiments, the saw 14 may include trim angle adjustment mechanisms 400 adjacent both the shoe plate 208a, 208b at the front and the rear of the saw 14. The shoe plate 208b includes a surface 412 (FIGS. 13, 19) which faces the hole 408. The shoe plate 208b further includes a biasing surface 413 facing in an opposite direction of the surface 412 that faces the hole 408. The shoe 104 also includes a biasing surface 414 which projects in a direction perpendicular from the shoe plane SP. A spring 415 is positioned between the biasing surfaces 413, 414 of the shoe plate 208b and the shoe 104. The spring 415 biases the shoe plate 208 towards the set screw 404 along the axis A9.

The set screw 404 may press upon the surface 412 to adjust a trim angle TAN (i.e., "heel angle") of the blade B. In other words, the set screw 404 is in contact with the shoe plate 208b, and the set screw 404 acts against the bias of the spring 415 to adjust the trim angle TAN. As shown in FIG. 7, the trim angle TAN is measured between a trim axis TA (i.e., heel axis) formed at an intersection of the blade plane BP and the shoe plane SP and a reference trim axis RTA (i.e., reference heel axis). The reference trim axis RTA is parallel to the groove 108 of the shoe 104. The set screw 404 is slidably adjustable along the axis A9 to cause sliding movement of the shoe plate 208b which can align the trim axis TA with the reference trim axis RTA.

In some instances, the trim axis TA (e.g., the actual trim axis TA) may be misaligned with the reference trim axis RTA due to environmental/use factors, wear, shipping damage, dropping damage of the saw 14, and the like. Also, the trim axis TA may be required to be adjusted during assembly of the track saw 100. When the trim axis TA is not aligned with the reference trim axis RTA, cuts in the workpiece W by the blade B are wider than the width of the blade B. In most cases, it is desired to align (e.g., realign) the trim axis TA with the reference trim axis RTA. This ensures a straight cut in the workpiece W in parallel with the groove 108. With the trim axis TA aligned with the reference trim axis RTA, the cut generated by the blade B corresponds with the width of the blade B. However, the trim angle adjustment mechanism 400 may permit any desired trim angle afforded by movement of the set screw 404 (e.g., −1.0 degrees, −0.5 degrees, −0.25 degrees, +0.25 degrees, +0.5 degrees+1 degree relative to the trim axis TA). The illustrated trim angle adjustment mechanism 400 may permit any desired trim angle within a range between and including −0.25 degrees to +0.25 degrees relative to the trim axis TA. In other embodiments, the trim angle adjustment mechanism 400 may permit any desired trim angle within a range between and including −0.5 degrees and +0.5 degrees relative to the trim axis. In other embodiments, the trim angle adjustment mechanism 400 may permit any desired trim angle within a range between and including −1.0 degree and +1 degree relative to the trim axis.

The shoe plate 208b includes a pair of holes 416, and the shoe 104 includes a plurality of elongated holes 420. The elongated holes 420 are elongated in a lateral direction of the shoe 104 perpendicular to the longitudinal axis LA and parallel to the axis A9. In the illustrated embodiment, the elongated holes 420 may be elongated in a direction parallel to the axis A9 approximately 2 millimeters. In other embodiments, the elongated holes 420 may be elongated between 0.5 millimeter and 4 millimeters. The holes 416 and elongated holes 420 are aligned with one another and are configured to receive fasteners to secure the shoe plate 208b to the shoe 104 once the desired trim angle TAN is achieved by adjusting the set screw 404.

In adjusting the trim angle TAN, the saw 14 may be maneuvered such that the blade B rests on and is supported by a flat surface (e.g., the workpiece W) with the lockout mechanism 300 in the fully plunged position such that the trim angle adjustment mechanism 400 can be acted upon to achieve the desired trim angle TAN. While resting on and/or supported by the flat surface, a level (e.g., a bubble level, laser level, or the like) may be coupled to or otherwise supported by the saw 14. This configuration allows a user to support the saw 14 in one hand and to adjust the set screw 404 with the other hand while referencing the level to achieve the desired trim angle TAN. Once the set screw 404 is in the desired position, the fasteners may be applied to the holes 416 and the elongated holes 420 to secure the trim angle adjustment mechanism 400 at the desired trim angle TAN.

Figure 15:
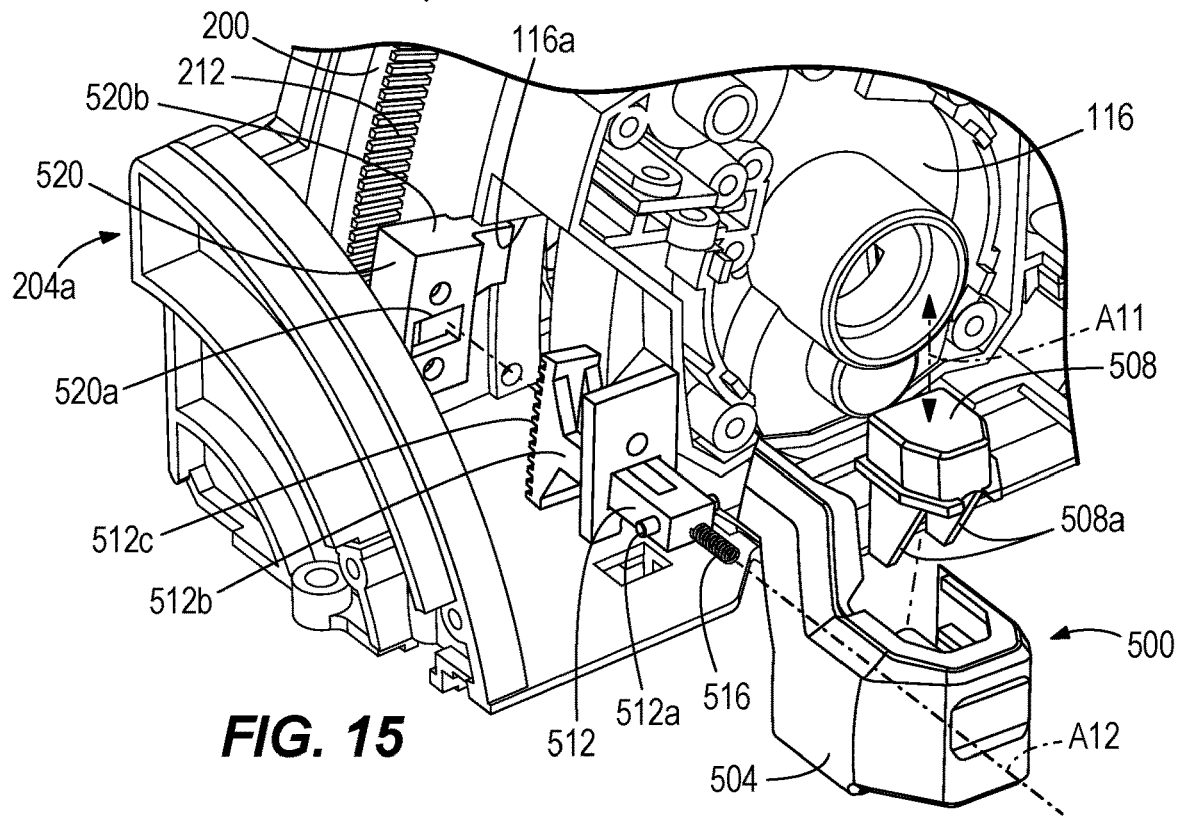
FIG. 15 is an exploded view of the depth guide and the depth stop.
Figure 16:
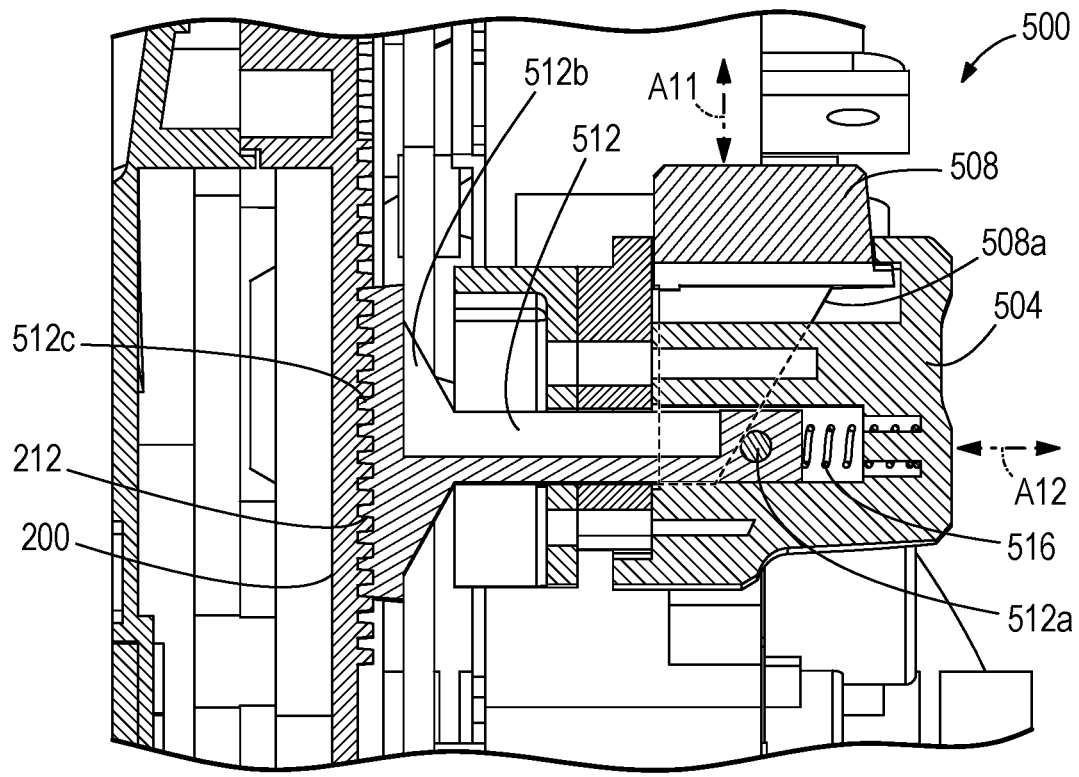
FIG. 16 is a section view of the depth guide and the depth stop taken along section line 16-16 in FIG. 14 and having the depth stop in the engaged position.
Figure 17:
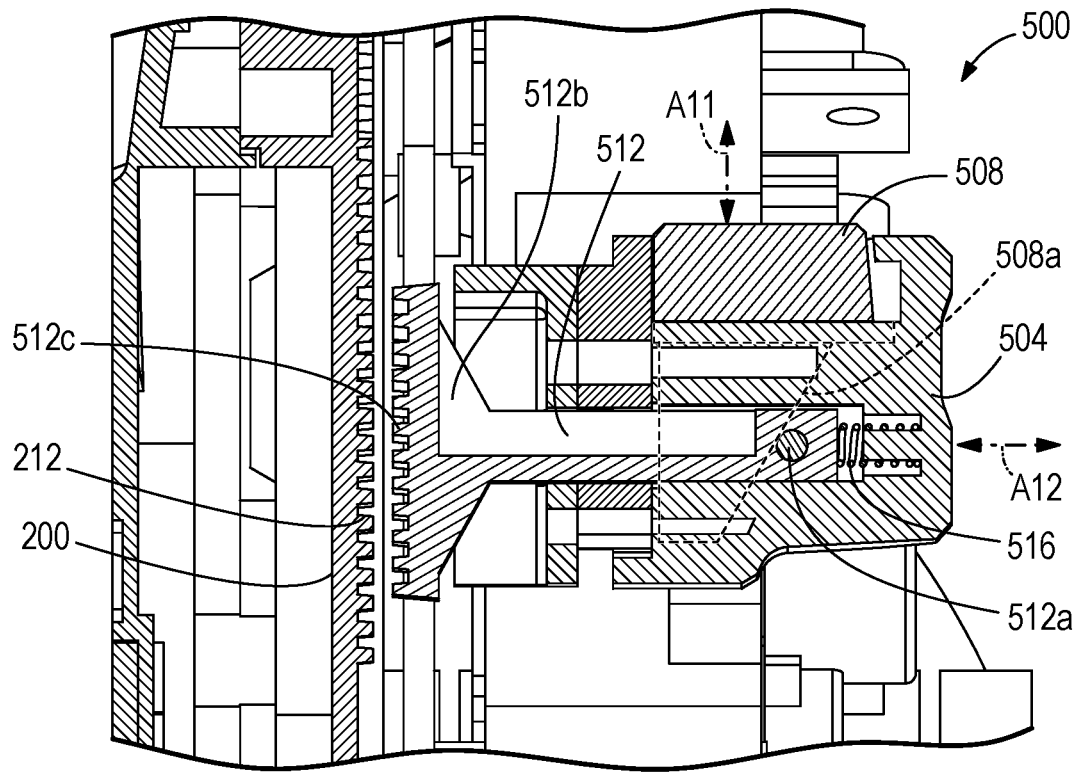
FIG. 17 is a section view of the depth guide and the depth stop taken along section line 16-16 in FIG. 14 and having the depth stop in the disengaged position.
Figure 18:
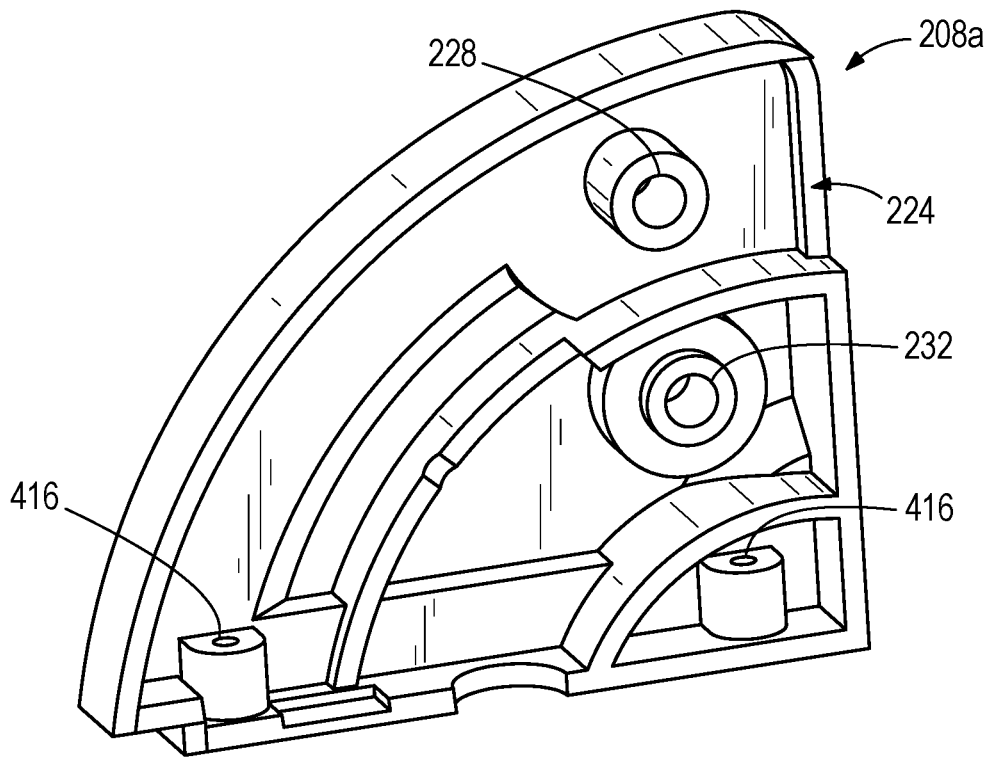
FIG. 18 is a rear perspective view of the shoe plate of the front bevel hinge.
Figure 19:
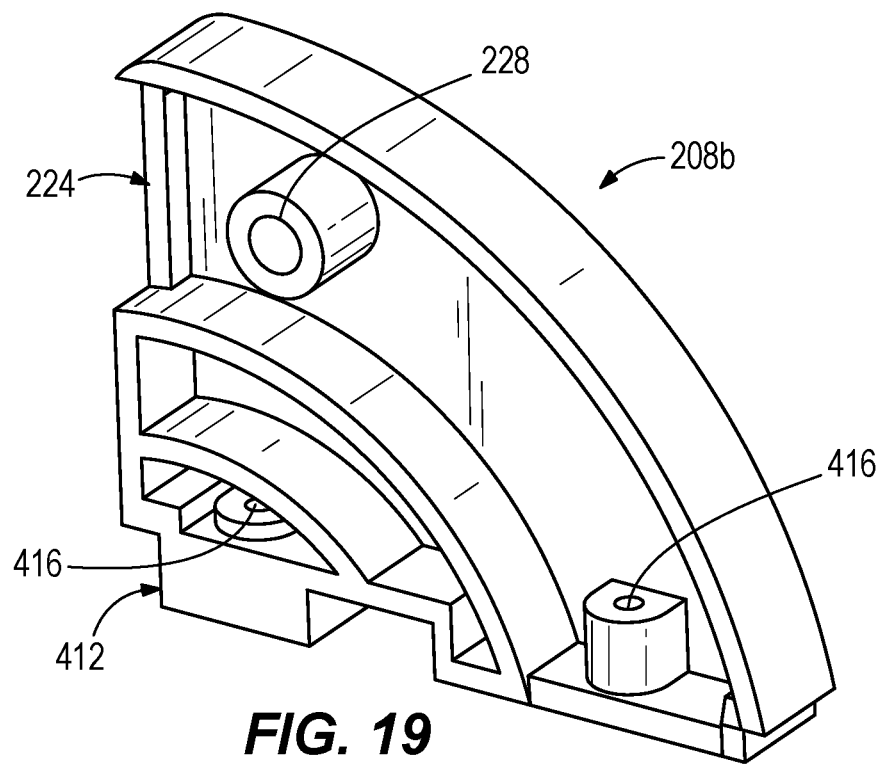
FIG. 19 is a front perspective view of the shoe plate of the rear bevel hinge.

FIGS. 14-17 relate to the depth stop assembly 500. With reference to FIG. 14, the depth guide 176 includes an arcuate cutout 176h which is in-line with teeth 212 of the carriage 200. As illustrated in FIG. 15, the depth stop assembly 500 includes a housing 504, a button 508, a plunger 512, a spring 516, and a stop 520. The housing 504 is configured to receive at least a portion of the button 508 and the plunger 512 therein. As illustrated in FIG. 15, the button 508 has a pair of cam surfaces 508a. The plunger 512 includes pin 512a which is configured to engage the cam surface 508a (i.e., the pin 512a may be considered a cam engaging surface). The spring 516 is positioned between the plunger 512 and the housing 504, and biases the plunger 512 away from the housing 504. The plunger 512 further includes a head 512b including a plurality of teeth 512c. The head 512b is received within a cutout 520a of the stop 520. The stop 520 includes a stop surface 520b which is configured to abut an abutment surface 116a (FIG. 15) of the saw unit 116. The depth stop assembly 500 is slidable along the arcuate cutout 176h to different positions coinciding with different plunge depths of the blade B. The plunger 512 is carried along with the housing 504 and stop 520 along the arcuate cutout 176h. The plunger 512 is movable between a locked position (FIG. 16) and a released position (FIG. 17). In the locked position, the teeth 512c of the plunger 512 engage the teeth 212 of the carriage 200 and the depth stop assembly 500 is locked to the depth guide 176 to coincide with a desired plunge depth. In the released position, the teeth 512c of the plunger 512 are removed from the teeth 212 of the carriage 200 and the depth stop assembly 500 is repositionable along the depth guide 176. The depth stop assembly 500 is repositionable along the depth guide 176 to any desired location corresponding to any desired blade depth. For example, the depth stop assembly 500 is slidable to any desired position along the depth guide 176 corresponding to a scoring depth, a maintenance depth corresponding with a blade exchange, or even a full plunge depth. Further still, the depth stop assembly 500 is slidable to any desired toothed position along the depth guide 176 not corresponding with any of the aforementioned positions. For example, the depth stop assembly 500 is slidable to correspond with a desired depth of cut of the saw blade B (e.g., 2 centimeters, 4 centimeters, etc.) as indicated by the indicia 177. In the illustrated embodiment, the depth stop assembly 500 is movable along the depth guide 176 between a raised position corresponding with 0 centimeters of depth of cut (e.g., the depth stop assembly 500 provides another plunge lockout mechanism where the blade B is inhibited from plunging below the shoe 104), and a lowered position corresponding with about 5.7 centimeters of depth of cut (2¼ inches, e.g., where the depth stop assembly 500 does not inhibit the blade B, and the blade B is configured to be fully plunged along the depth guide 176). While mounted on the track 18, the lowered position of the depth stop assembly 500 corresponds with about 5.4 centimeters of depth of cut (2⅛ inches). However, depending at least on the size of the blade B and the thickness of the track 18, the uninhibited depth of cut of the blade B may differ. The spring 516 biases the plunger 512 and thus the button 508 to the locked position.

To transition to the released position, the button 508 must be depressed along an axis A11 which extends generally parallel to the blade plane BP. Upon being depressed, the cam surfaces 508a press upon the pin 512a to retract the plunger 512 along an axis A12 which is perpendicular to the axis A11. The axis A12 is also transverse to the teeth 212 of the carriage 200.

Figure 20:
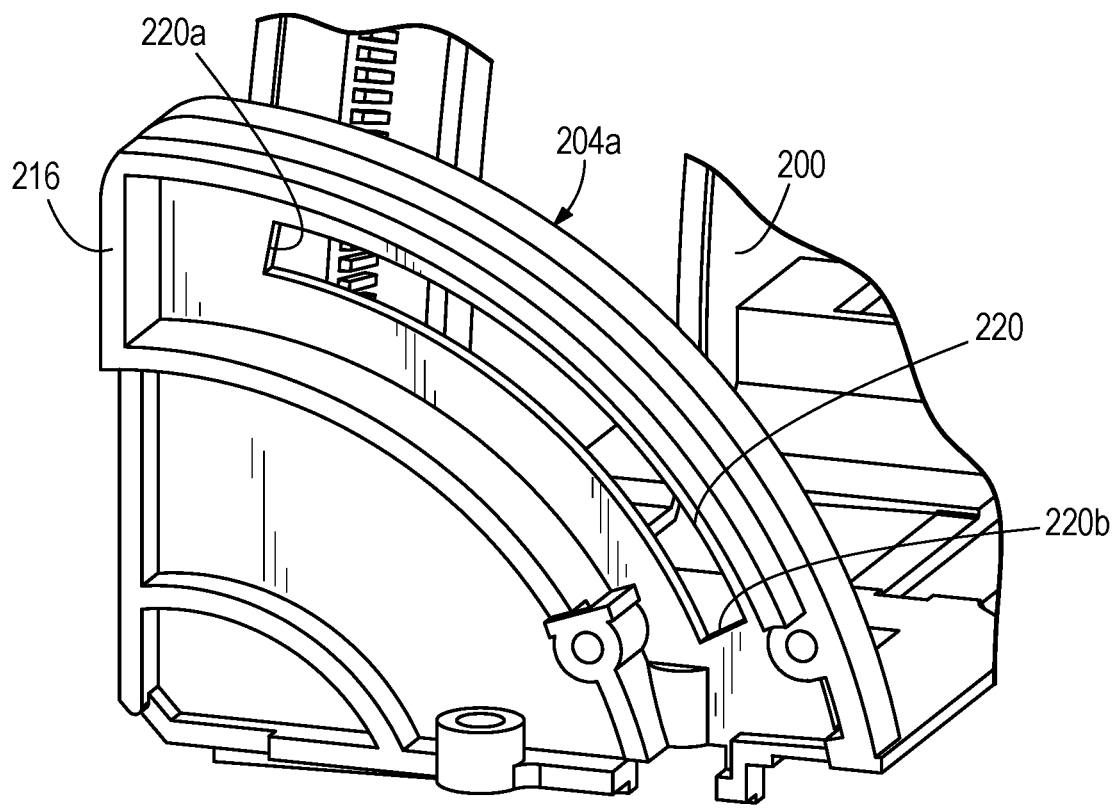
FIG. 20 is a front perspective view of the carriage plate of the front bevel hinge.
Figure 21:
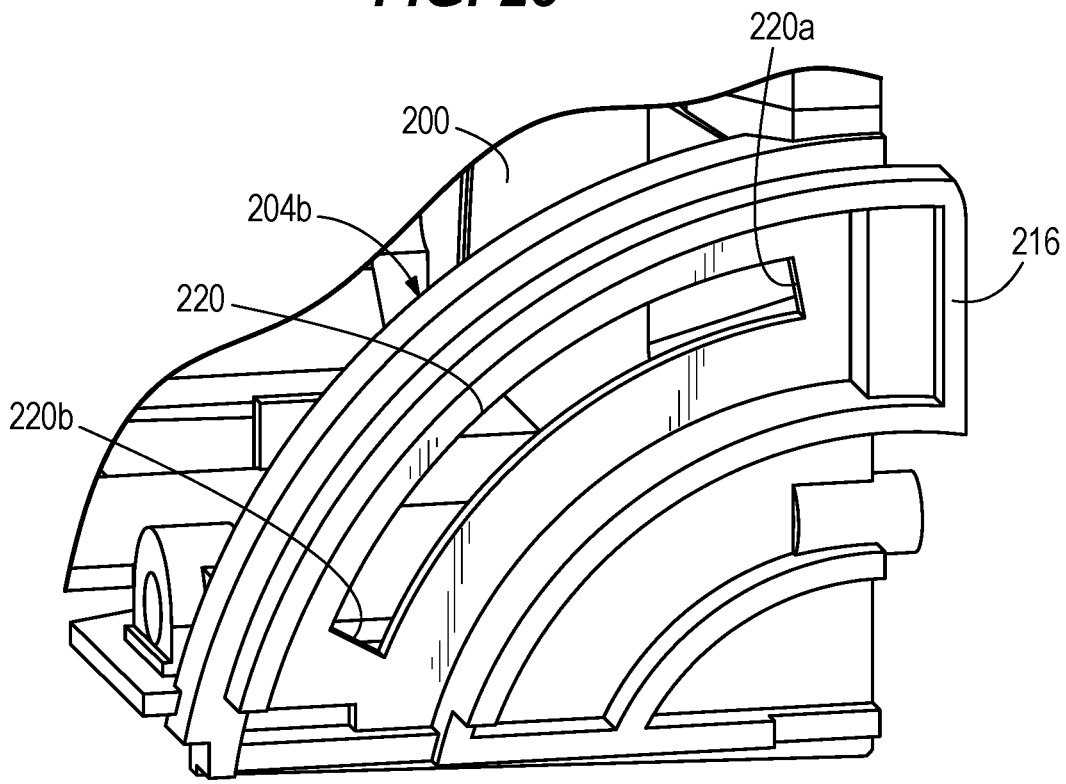
FIG. 21 is a rear perspective view of the carriage plate of the rear bevel hinge.

The bevel mechanism 164 is configured to adjust the blade B about the bevel axis BA to a desired bevel angle θ (FIG. 5). As illustrated in FIGS. 18-21, each of the carriage plates 204a, 204b includes at least one parallel arc slide 216 (i.e., a key) that engages at least one corresponding raceway 224 (i.e., a keyway) defined in the shoe plates 208a, 208b. The engagement between the carriage plates 204a, 204b and shoe plates 208a, 208b is also illustrated in at least FIGS. 3 and 8. Engagement between the parallel arc slides 216 and the arcuate raceways 224 permits adjustment of the bevel angle θ. The parallel arc slides 216 function as a guide to slidably engage the arcuate raceways 224 of the shoe plates 208a, 208b to adjust the bevel angle θ. As illustrated in FIGS. 20 and 21, the arc slides 216 are generally arcuately shaped. The slides 216 and raceways 224 include arc centers in alignment with the bevel axis BA.

In the illustrated embodiment, the bevel angle θ is defined as an angle extending between the blade plane BP and a vertical reference plane which is perpendicular relative to the shoe 104 and coincident with the blade plane BP at the bevel angle θ1. A bevel angle θ of 0 degrees, θ1 in FIG. 5, corresponds with the blade plane BP aligned with the vertical reference plane. The bevel angle θ1 represents a first (i.e., "standard") lower bound of the bevel angle θ. The blade plane BP is movable to a bevel angle θ2 of 45 degrees. The bevel angle θ2 represents a first (i.e., "standard") upper bound of the bevel angle. The bevel angle θ is movable by a linkage 632 to a second (i.e., "reduced") lower bound represented by the bevel angle θ0. In the illustrated embodiment the bevel angle θ0 is −1 degrees. The bevel angle θ is movable by an extended bevel knob 620 to a second (i.e., "extended") upper bound represented by the bevel angle θ3. In the illustrated embodiment, the bevel angle θ3 is 47 degrees. However, any of the bevel angles θ (i.e., θ0, θ1, θ2, θ3) differ in other embodiments (e.g., θ0 may be −2 degrees, θ3 may be 48 degrees, and the like). In other embodiments, other additional means may provide stops or resting places for other common bevel angles (e.g., 15 degrees, 22.5 degrees, 30 degrees, 60 degrees, 75 degrees, and the like).

As illustrated in FIG. 5, the trim axis TA is aligned with the reference trim axis RTA, and the bevel axis BA extends parallel to the longitudinal axis LA. In this instance, the bevel axis BA is located exterior to (e.g., to the left of) the track 104. In the illustrated embodiment, the carriage plates 204a, 204b permit pivoting of the carriage 120, and thus the blade B and the blade plane BP about the bevel axis BA, between a first range of bevel angles θ1-θ2. In the illustrated embodiment, the first range of bevel angles θ1-θ2 is bounded by a lower bound θ1 of 0 degrees and is bounded by an upper bound θ2 of 45 degrees. Other bounds are possible.

Figure 23:
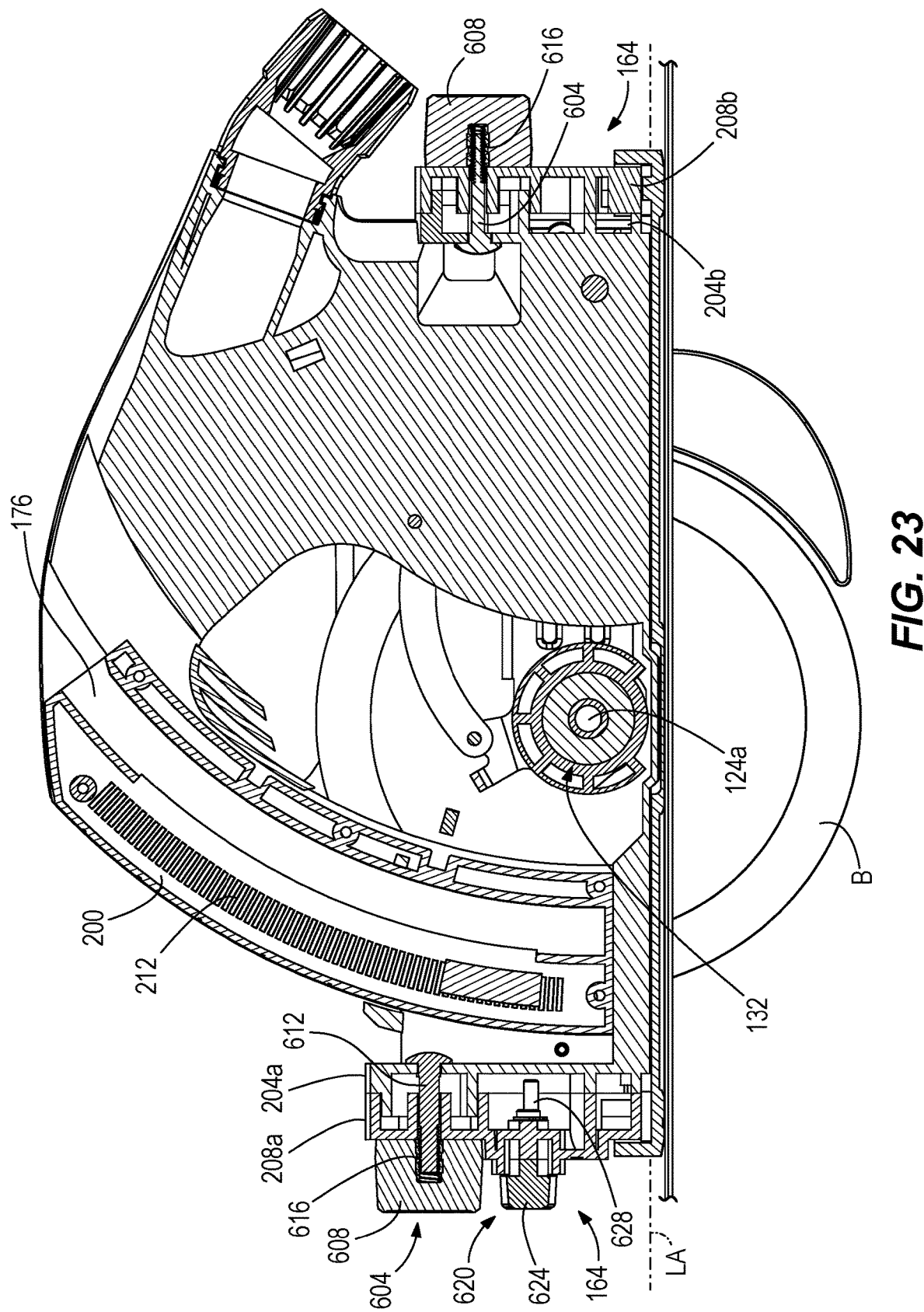
FIG. 23 is a section view of the track saw taken along line 23-23 in FIG. 5.
Figure 24:
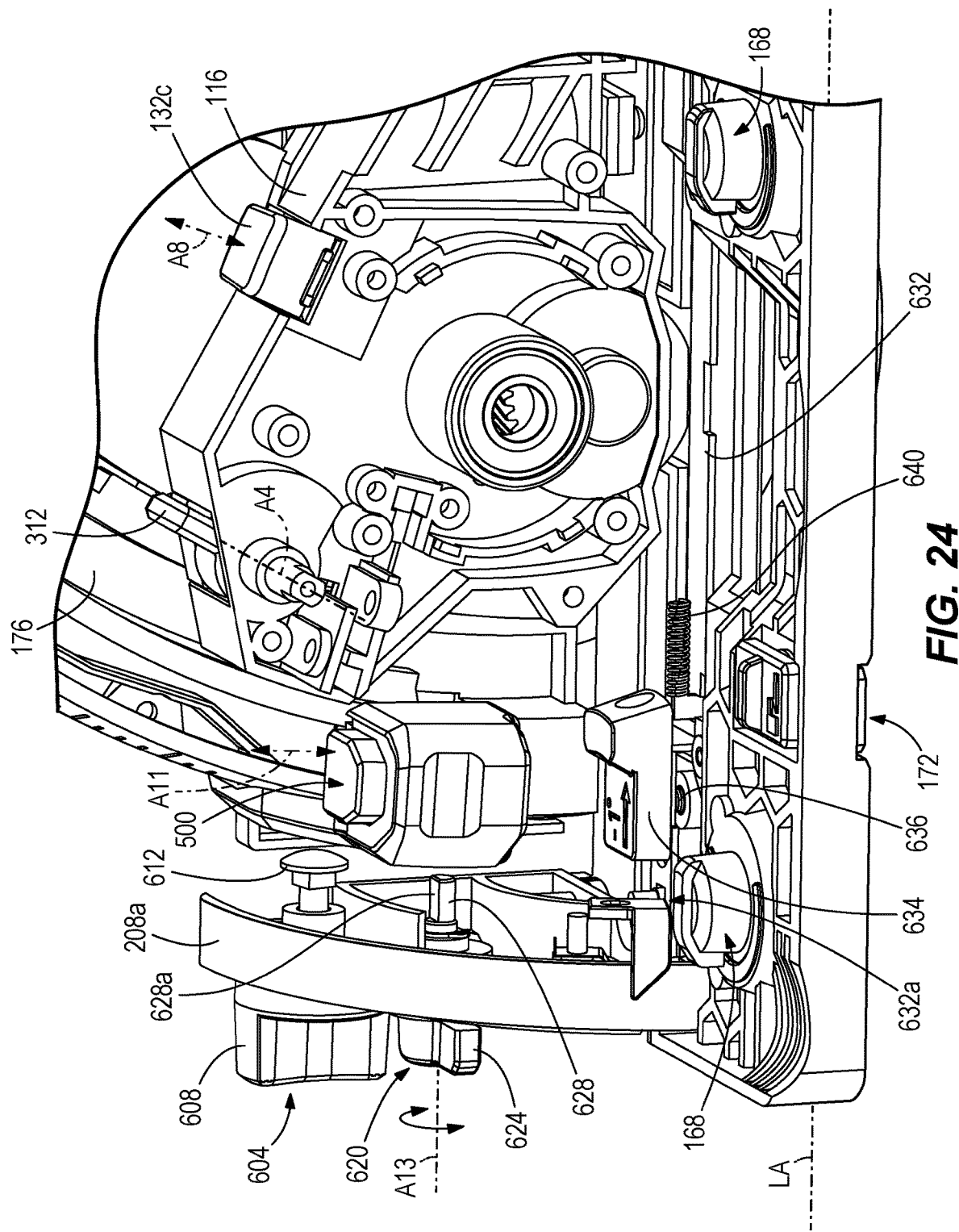
FIG. 24 is a partial perspective view of the linkage and the front bevel hinge with some components of the track saw hidden.
Figure 25:
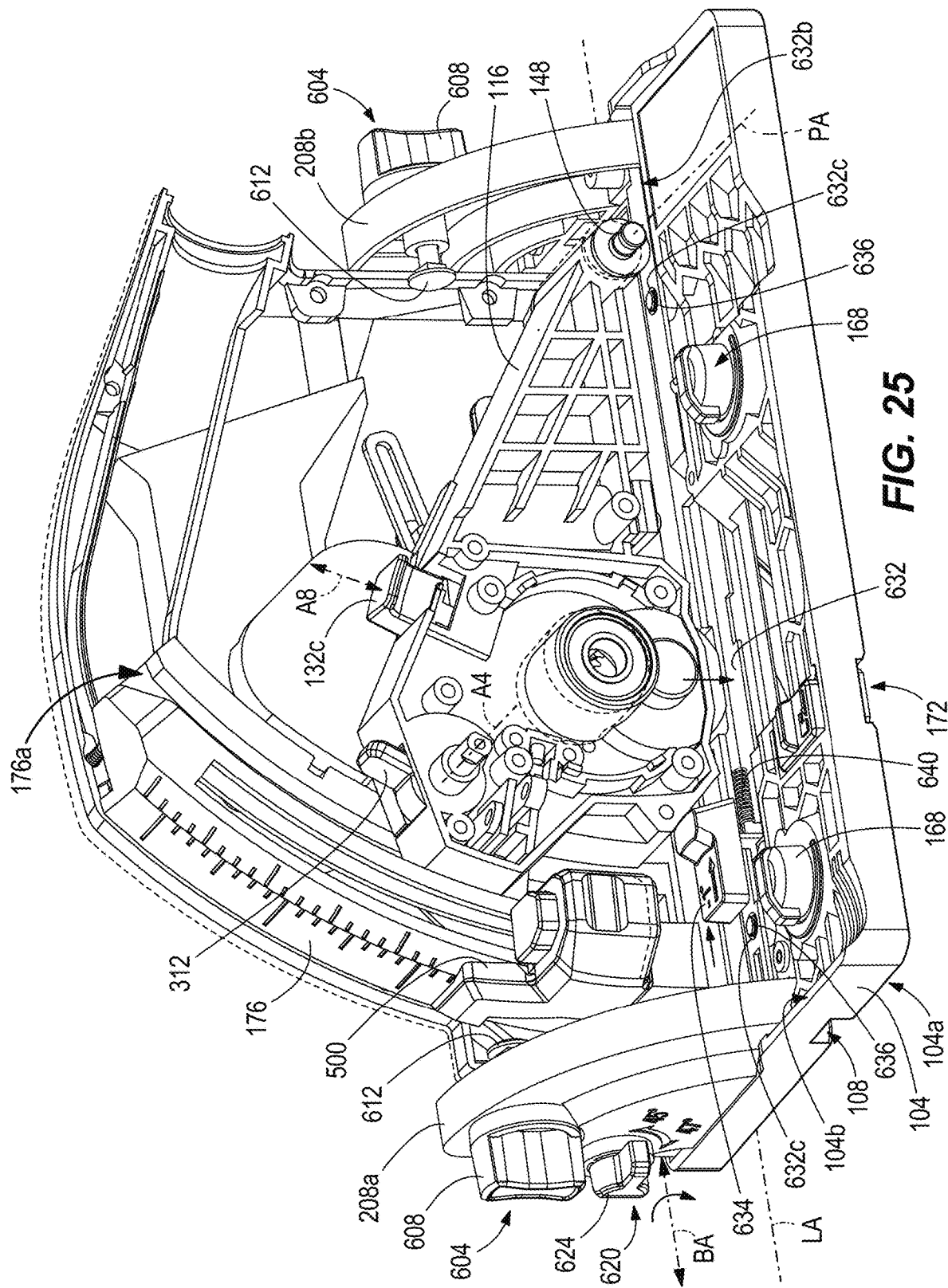
FIG. 25 is a partial perspective view of the linkage and the rear bevel hinge with some components of the track saw hidden.

As illustrated in FIGS. 23 and 24, bevel locks 604 are provided at the front and rear of the saw 14. The bevel locks 604 are operable to secure and release the carriage 120 relative to the shoe 104 at a desired bevel angle θ. In other embodiments, the bevel locks 604 may be provided at only one of the front and rear of the saw 14. In the illustrated embodiment, shown best in FIG. 23, each bevel lock 604 includes a knob 608 coupled to a fastener 612 which is secured to the corresponding shoe plate 208a, 208b. More specifically, the fastener 612 extends through a hole 228 in each shoe plate 208a, 208b and an arcuate slot 220 (see FIGS. 20, 21) in each carriage plate 204a, 204b. The arcuate slot 220 has a first end 220a and an opposite second end 220*b*. The knob 608 may include threads 616 which engage corresponding threads of the fastener 612 such that the fastener 612 can be tightened to apply a clamping force between corresponding shoe plates 208*a*, 208*b* and carriage plates 204*a*, 204*b* to secure the carriage 200 relative to the shoe 104. Once the carriage 200 is secured to the shoe 104 via the bevel locks 204, the bevel angle θ is fixed, and the track saw 100 can be translated along the track 104 to make the desired cut in the work piece W.

The linkage 632 is provided within the saw 14 to allow adjustment of the saw unit 116 from having the bevel angle θ bounded within the above-described first bevel angle range, θ1-θ2 to having the bevel angle θ bounded within a second bevel angle range θ0-θ2. The linkage 632 is operable independent of the extended bevel knob 620. The linkage 632 is illustrated in detail in FIGS. 22 and 24-25. In the illustrated embodiment, the linkage 632 is located between the carriage 200 and the shoe 104. The linkage 632 is slidably supported upon the carriage 200 such that the linkage 632 pivots with the carriage 200 when the bevel angle θ is adjusted. A user may adjust the position of the linkage 632 through a knob 634. The linkage 632 engages a spring 640 (FIG. 22), which biases the linkage 632 forward (in a direction parallel to the longitudinal axis LA) to bind the saw unit 116 within the first bevel angle range θ1-θ2. In either position of the linkage 632, as previously described, the bevel locks 604 secure and are configured to release the carriage 200 relative to the shoe 104 to adjust the saw unit 116 to the desired bevel angle θ.

When the linkage 632 is in a first position (FIGS. 22, 24), the linkage 632 restricts the lower bound of the bevel angle range (e.g., the first bevel angle range θ1-θ2) to 0 degrees as represented by θ1. In the first position, a first end 632*a* of the linkage is aligned with the carriage plate 204*a* at the front of the saw 14. The linkage 632 has an opposite second end 632*b*. In the illustrated embodiment, the range of bevel angles θ1-θ3 includes and extends between 0 and 45 degrees. Other ranges are possible. In the illustrated embodiment, set screws 636 are used to support the linkage 632 to the bevel angle θ1. The set screws 636 extend through the shoe 104. The set screws 636 may be adjusted (e.g., calibrated) relative to the shoe 104 to ensure the accuracy of the bevel angle θ1 (i.e., 0 degrees). With the linkage 632 in the first position and the carriage 200 adjusted to the lower bound (θ1) of the first bevel angle range θ1-θ3, the linkage 632 rests upon the set screws 636 (FIG. 22) which extends upward from the shoe 104.

When the linkage 632 is in a second, bypass position (FIG. 25), the linkage 632 is movable to the second (i.e., "reduced") lower bound represented by the bevel angle θ0. When moved to the bypass position, holes 632*c* in the linkage 632 are aligned with the set screws 636, and the linkage 632 is supported by the carriage 120 and not the set screws 636. In this bypass position, the set screws 636 are aligned with the holes 632*c*, and the set screws 636 are receivable in the holes 632*c*. While moved to the bypass position, the saw unit 116 may pivot about the bevel axis BA. In this position, the linkage 632 restricts adjustment of the bevel angle θ to within the second bevel angle range θ0-θ2. In the bypass position, the second end 632*b* of the linkage 632 is aligned with the carriage plate 204*b* at the rear of the saw 14. In the illustrated embodiment, the second bevel angle range θ0-θ2 includes and extends between −1 and 45 degrees. Other ranges are possible.

Figure 22:
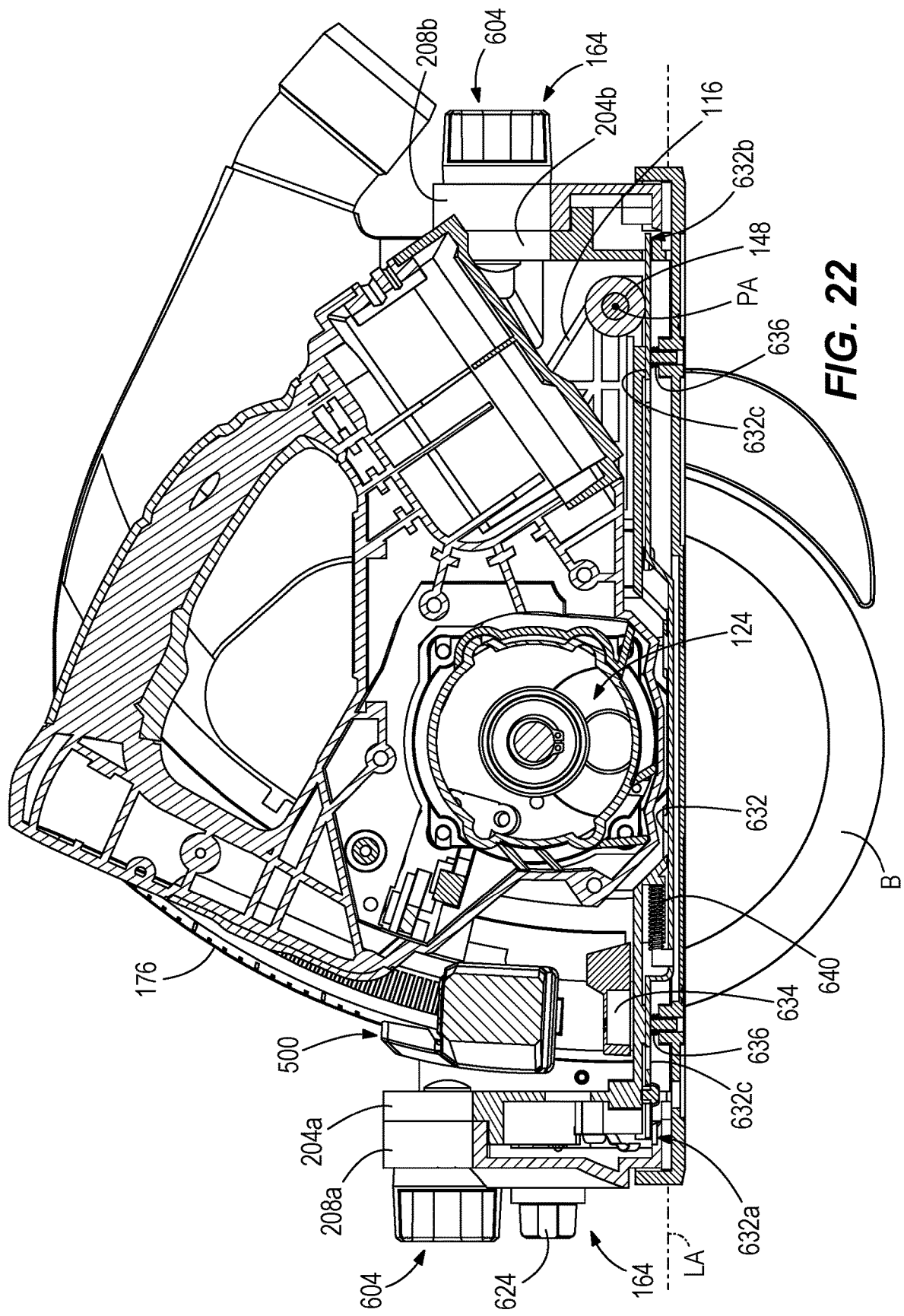
FIG. 22 is a section view of the track saw taken along line 22-22 in FIG. 5.

The upper bound (e.g., θ2) of the bevel angle range is adjustable by the extended bevel knob 620 to the second (i.e., extended) upper bound (θ3). The extended bevel knob 620 includes a user-actuatable surface 624 and a shaft 628. The shaft 628 is best illustrated in FIG. 24, is generally cylindrical, but includes a flat surface 628*a* between axial ends of the generally cylindrical shaft 628. The shaft 628 is pivotable about an axis A13 such that the flat surface 628*a* can selectively face the second end 220*b* (e.g., the stop surface) of the arcuate slot 220. When the flat surface 628*a* faces the second end 220*b*, the upper bound is extended to correspond with bevel angle θ3 (e.g., 47 degrees). When the flat surface 628*a* faces the first end 220*a*, the upper bound is maintained at the bevel angle θ2 (e.g., 45 degrees). Other angles are possible. As illustrated in FIGS. 22 and 23, the bevel locks 604 and the user-actuatable surface 624 of the extended bevel knob 620 each project longitudinally away from all of the carriage plates 204*a*, 204*b* and shoe plates 208*a*, 208*b*. In other words, the bevel locks 604 and the extended bevel knob 620 are each accessible from either longitudinal end of the saw 14.

Although the invention has been described in detail with reference to certain preferred embodiments, variations and modifications exist within the scope and spirit of one or more independent aspects of the invention as described.

Various features of the invention are set forth in the following claims.

What is claimed is:

1. A saw comprising:
   a shoe;
   a motor housing pivotably coupled to the shoe and movable between a raised position in which a saw blade is located above the shoe and a plunged position in which at least a portion of the saw blade is located beneath the shoe;
   a motor located within the motor housing and configured to rotate the saw blade;
   a trigger configured to activate the motor in response to being actuated; and
   a lockout mechanism including
      a lever including a first end, an opposite second end, and a trigger abutment surface integrated with the lever either at the first end or between the first end and the second end, the lever movable about or along a first axis between
         a safety position in which the trigger abutment surface inhibits actuation of the trigger, and
         a use position in which the trigger abutment surface permits actuation of the trigger, and
      a plunge stop formed as a separate component from the lever, the plunge stop coupled to the second end of the lever and movable due to movement of the lever about or along a second axis that is different from the first axis between
         a first position corresponding with the safety position of the lever to inhibit the motor housing from being moved from the raised position toward the plunged position, and
         a second position corresponding with the use position of the lever to permit the motor housing to be moved from the raised position toward the plunged position.

2. The saw of claim 1, wherein the lockout mechanism further comprises a spring biasing the lever to the safety position such that a force input on the lever against the bias of the spring can move the lever from the safety position to the use position.

3. The saw of claim 2, wherein the lever is pivotable about a pivot joint between the first end and the second end of the lever, and wherein the spring presses against the lever between the first end and the pivot joint.

4. The saw of claim 2, wherein when the lever is in the use position and the motor housing is at least partially plunged, the force input may be removed, and the lockout mechanism maintains the lever in the use position at least until the motor housing is returned to the raised position.

5. The saw of claim 3, wherein upon full retraction of the motor housing, the spring returns the lever to the safety position.

6. The saw of claim 3, further comprising a depth guide coupled to the shoe, wherein the depth guide includes an arcuate channel in which the plunge stop is receivable when in the second position, and wherein the lever is maintained in the use position when the plunge stop is positioned within the channel.

7. The saw of claim 1, wherein the second end of the lever is configured as a post, and wherein the plunge stop includes a bifurcated fork in which the post is received.

8. The saw of claim 1, further comprising a depth guide coupled to the shoe, wherein in the first position, the plunge stop abuts an abutment surface of the depth guide, and in the second position, the plunge stop is misaligned with the abutment surface and aligned with an arcuate channel within the depth guide.

9. A saw comprising:
a shoe;
a motor housing pivotably coupled to the shoe and movable between a raised position in which a saw blade is located above the shoe and at least one plunged position in which at least a portion of the saw blade is located beneath the shoe;
a motor located within the motor housing and configured to rotate the saw blade;
a trigger configured to activate the motor in response to being actuated; and
a lockout mechanism including
a first lever,
a second lever,
a first plunge stop movable by at least one of the first lever or the second lever between
a first position, in which the first plunge stop is configured to inhibit the motor housing from being moved from the raised position toward the plunged position, and
a second position, in which the first plunge stop is configured to permit the motor housing to be moved from the raised position toward the plunged position; and
a second plunge stop movable by the second lever between
a use position, in which the second plunge stop is configured to permit the motor housing to be moved between the raised position and a first plunged position in which at least a portion of the saw blade is located beneath the shoe, the first plunged position defining a maximum plunge depth of the saw blade, and
a blade exchange position, in which the second plunge stop retains the motor housing in a second plunged position in which at least a portion of the saw blade is located beneath the shoe, the second plunged position defining a blade exchange plunge depth of the saw blade that is less than the maximum plunge depth.

10. The saw of claim 9, wherein the second plunge stop is further movable by the second lever to a fully plunged position, in which the second plunge stop is configured to retain the motor housing in the first plunged position corresponding with the maximum plunge depth.

11. The saw of claim 9, wherein the first lever includes a first trigger abutment surface and the second lever includes a second trigger abutment surface, wherein when the second plunge stop is moved by the second lever to the blade exchange position, at least one of the first trigger abutment surface or the second abutment surface inhibits actuation of the trigger.

12. The saw of claim 11, wherein when the second plunge stop is moved by the second lever to the blade exchange position, the second abutment surface inhibits actuation of the trigger.

13. The saw of claim 12, wherein the second lever includes a hook configured to engage a corresponding hook on the trigger to inhibit actuation of the trigger in the blade exchange position.

14. The saw of claim 9, further comprising a shoe plate extending from the shoe, the shoe plate supporting the motor housing on the shoe, the shoe plate being coupled to the shoe by a trim angle adjustment mechanism operable to adjust a trim angle of the saw blade relative to the shoe when the second plunge stop is in the blade exchange position.

15. The saw of claim 9, further comprising a spring configured to bias the second plunge stop to the blade exchange position.

16. The saw of claim 15, wherein the second plunge stop includes a first end engageable with the second lever and an opposite second end, and wherein the second plunge stop is pivotable about a pivot joint located between the first end and the second end of the second plunge stop.

17. The saw of claim 16, wherein the spring applies a biasing force to the second plunge stop between the pivot joint and the second end of the second plunge stop.

18. The saw of claim 9, wherein the lockout mechanism further comprises a connector bar coupled to both the first lever and the second lever, and the first plunge stop is movable by either (A) the first lever or (B) the second lever via the connector bar between the first position and the second position.

19. The saw of claim 9, wherein the first lever includes a first end, an opposite second end, and a trigger abutment surface at the first end or between the first end and the second end, the first lever being movable between
a safety position in which the trigger abutment surface inhibits actuation of the trigger, and
a use position in which the trigger abutment surface permits actuation of the trigger.

20. The saw of claim 19, wherein the second lever includes a first end, an opposite second end, and a second trigger abutment surface, the second lever being movable between
a safety position in which the second trigger abutment surface inhibits actuation of the trigger, and
a use position in which the trigger abutment surface permits actuation of the trigger.

\* \* \* \* \*